US009823514B2

United States Patent
Lim et al.

(10) Patent No.: US 9,823,514 B2
(45) Date of Patent: Nov. 21, 2017

(54) LIQUID CRYSTAL DISPLAY AND METHOD FOR MANUFACTURING THE SAME

(71) Applicant: Samsung Display Co. Ltd., Yongin, Gyeonggi-do (KR)

(72) Inventors: Ho Lim, Suwon-si (KR); Sung Yi Kim, Hwaseong-si (KR); Duck Jong Suh, Seoul (KR); Hyun Ku Ahn, Hwaseong-si (KR); Gi Hoon Yang, Ansan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/072,985

(22) Filed: Mar. 17, 2016

(65) Prior Publication Data

US 2017/0068133 A1 Mar. 9, 2017

(30) Foreign Application Priority Data

Sep. 4, 2015 (KR) ........................ 10-2015-0125265

(51) Int. Cl.
*C09K 19/00* (2006.01)
*G02F 1/1337* (2006.01)
*G02F 1/1341* (2006.01)
*C09K 19/56* (2006.01)

(52) U.S. Cl.
CPC ........ *G02F 1/133711* (2013.01); *C09K 19/56* (2013.01); *G02F 1/1341* (2013.01); *G02F 1/133788* (2013.01); *G02F 2001/133726* (2013.01); *G02F 2001/133742* (2013.01); *Y10T 428/1005* (2015.01)

(58) Field of Classification Search
CPC ......... G02F 1/133711; G02F 1/133788; G02F 1/13378; G02F 1/1337; G02F 1/1341; G02F 2001/133715; G02F 2001/133726; G02F 2001/133742; C09K 19/3809; C09K 19/3814; C09K 19/3828; C09K 19/56; Y10T 428/10; Y10T 428/1005
USPC .... 428/1.1, 1.2; 349/93, 123, 127, 135, 191; 438/30
See application file for complete search history.

(56) References Cited

U.S. PATENT DOCUMENTS

| 2004/0080685 A1* | 4/2004 | Yamada ............ G02F 1/133711 349/113 |
| 2004/0188653 A1* | 9/2004 | Kataoka ................ C09K 19/14 252/299.01 |
| 2015/0166894 A1* | 6/2015 | Khew .................... C09K 19/56 349/123 |

FOREIGN PATENT DOCUMENTS

KR   1020170019544 A   2/2017

\* cited by examiner

*Primary Examiner* — Ruiyun Zhang
(74) *Attorney, Agent, or Firm* — Cantor Colburn LLP

(57) ABSTRACT

A liquid crystal display includes a first substrate, a second substrate facing the first substrate, a liquid crystal layer disposed between the first substrate and the second substrate, a first liquid crystal alignment layer disposed between the liquid crystal layer and the first substrate, and a second liquid crystal alignment layer disposed between the liquid crystal layer and the second substrate, wherein at least one of the first liquid crystal alignment layer and the second liquid crystal alignment layer includes a reactive mesogen.

17 Claims, 9 Drawing Sheets

LIQUID CRYSTAL DISPLAY AND METHOD FOR MANUFACTURING THE SAME

This application claims priority to Korean Patent Application No. 10-2015-0125265, filed on Sep. 4, 2015, and all the benefits accruing therefrom under 35 U.S.C. §119, the content of which in its entirety is herein incorporated by reference.

BACKGROUND

1. Field of the Invention

The present invention relates to a liquid crystal display and a method for manufacturing the same.

2. Description of the Prior Art

A liquid crystal display is one type of flat panel displays that has been widely used. A liquid crystal display includes two substrates on which field generating electrodes, such as a pixel electrode and a common electrode are formed, and a liquid crystal layer interposed between the two substrates.

The liquid crystal display displays an image by applying a voltage to field generating electrodes and generating an electric field in the liquid crystal layer. The alignment direction of the liquid crystals in the liquid crystal layer is determined by the generated electric field, and controls the polarization of incident light.

SUMMARY

The present invention provides a liquid crystal display that includes an alignment layer having superior thermal stability. A method for manufacturing the liquid crystal display is also provided.

According to an exemplary embodiment, there is provided a liquid crystal display including a first substrate, a second substrate facing the first substrate, a liquid crystal layer disposed between the first substrate and the second substrate, a first liquid crystal alignment layer disposed between the liquid crystal layer and the first substrate, and a second liquid crystal alignment layer disposed between the liquid crystal layer and the second substrate, wherein at least one of the first liquid crystal alignment layer and the second liquid crystal alignment layer includes a reactive mesogen represented by Chemical Formula 1, <Chemical Formula 1>

$$\text{VA} - \text{X} - \text{R}$$

wherein in the Chemical Formula 1, VA is

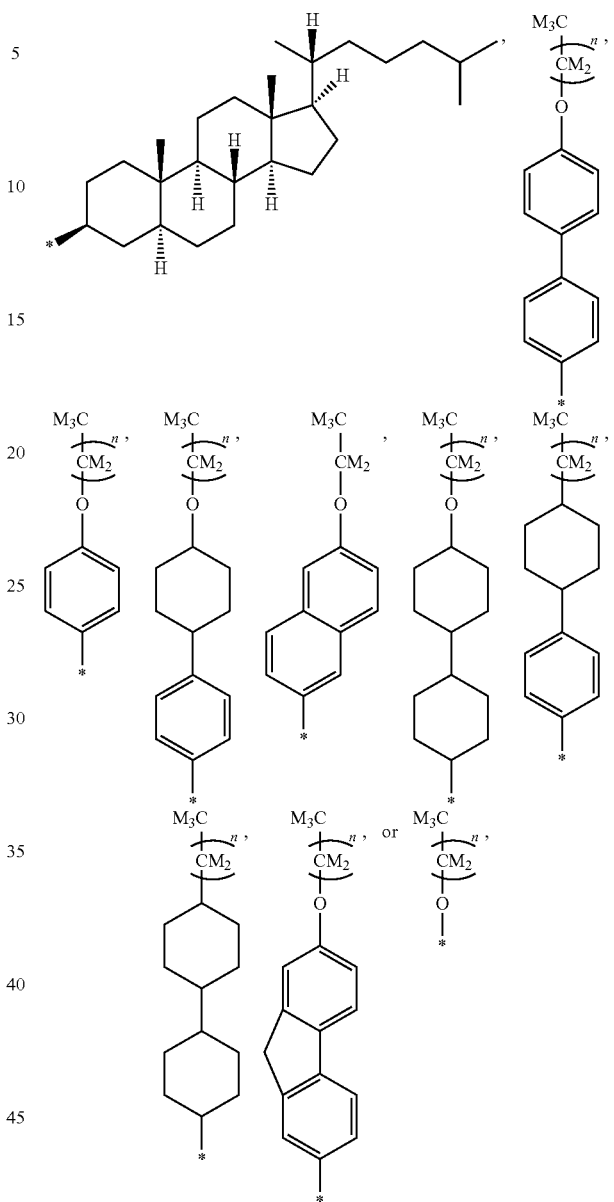

and each M is independently H, $CH_3$, $-(CH_2)nCH_3$, F, Br, I, OH, $C_3H_7$, $NH_2$, or $-CN$;

R is

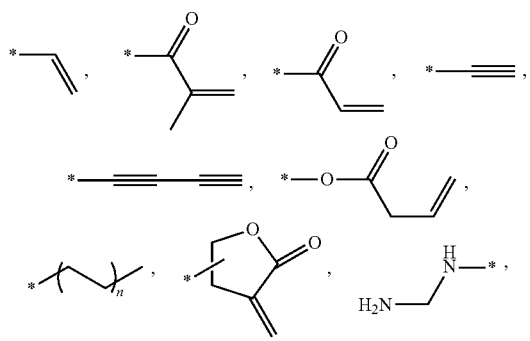

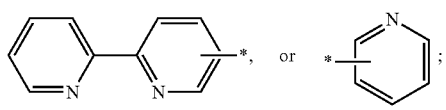

and
X is

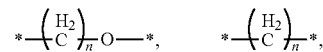

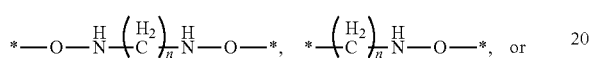

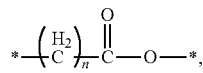

wherein each n is independently a natural number of 1 to 20.

In an exemplary embodiment, at least one of the first liquid crystal alignment layer and the second liquid crystal alignment layer may further include at least one vertical aligner represented by Chemical Formulas 25 to 29 below, <Chemical Formula 25>

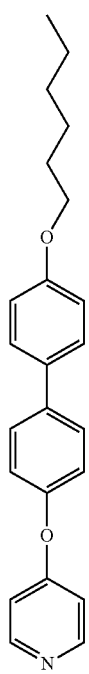

<Chemical Formula 26>

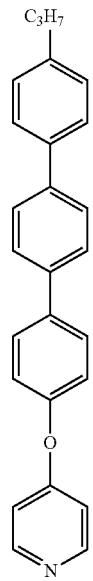

<Chemical Formula 27>

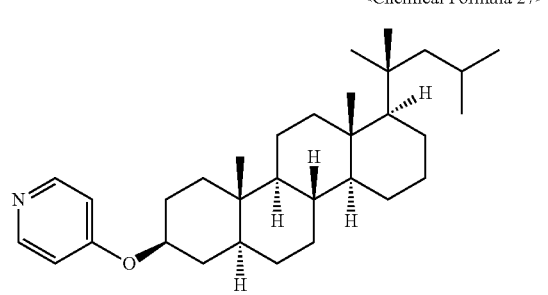

<Chemical Formula 28>

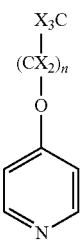

<Chemical Formula 29>

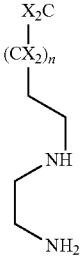

wherein in Chemical Formulas 28 and 29, each n is independently a natural number of 1 to 20, and X is H, F, Br, I, OH, $C_3H_7$, $NH_2$, or —CN.

In an exemplary embodiment, at least one of the first liquid crystal alignment layer and the second liquid crystal alignment layer further includes a polymerization initiator.

In an exemplary embodiment, at least one of the first liquid crystal alignment layer and the second liquid crystal alignment layer may further include at least one vertical aligner represented by Chemical Formulas 30 to 43 below, <Chemical Formula 30>

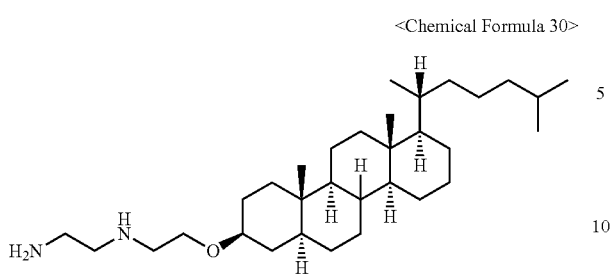

<Chemical Formula 31>

<Chemical Formula 32>

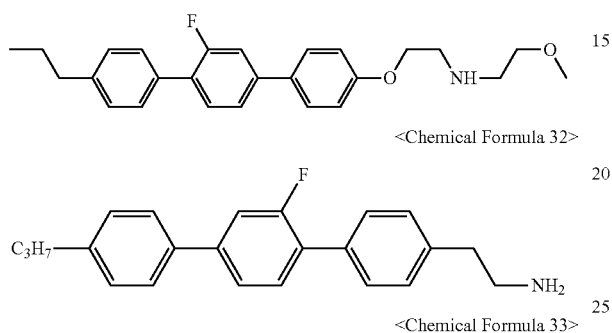

<Chemical Formula 33>

<Chemical Formula 34>

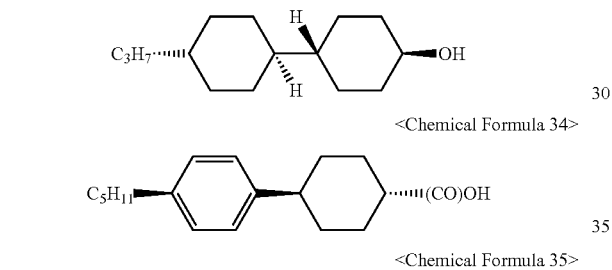

<Chemical Formula 35>

<Chemical Formula 36>

<Chemical Formula 37>

<Chemical Formula 38>

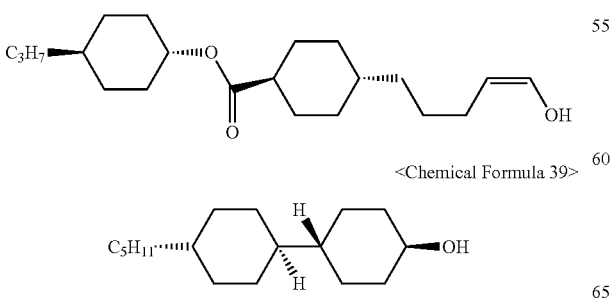

<Chemical Formula 39>

<Chemical Formula 40>

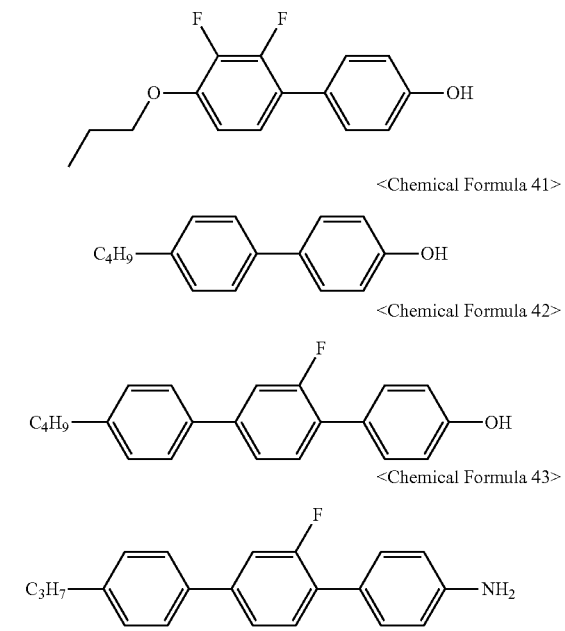

<Chemical Formula 41>

<Chemical Formula 42>

<Chemical Formula 43>

In an exemplary embodiment, both the first liquid crystal alignment layer and the second liquid crystal alignment layer include the reactive mesogen of Chemical Formula 1.

In an exemplary embodiment, both the first liquid crystal alignment layer and the second liquid crystal alignment layer include the at least one vertical aligner represented by Chemical Formulas 25 to 29.

In an exemplary embodiment, the reactive mesogen represented by Chemical Formula 1 may include a mixture of a reactive mesogen A in which R is

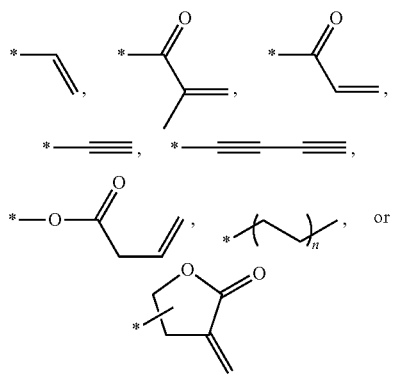

and a reactive mesogen B in which R is

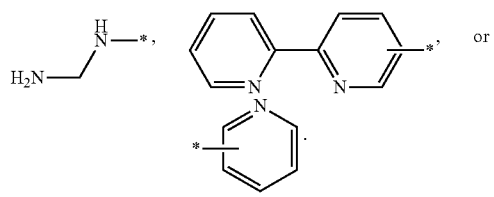

In an exemplary embodiment, at least one of the first liquid crystal alignment layer and the second liquid crystal alignment layer may be a single layer including at least one reactive mesogen represented by Chemical Formula 1 and at least one vertical aligner represented by Chemical Formulas 2 to 6.

In another exemplary embodiment, there is provided a method for manufacturing a to liquid crystal display, including preparing a first substrate and a second substrate facing each other, injecting a liquid crystal composition including liquid crystal molecules between the first substrate and the second substrate, and irradiating ultraviolet rays toward at least one of the first substrate and the second substrate while an electric field is applied, wherein the liquid crystal composition include a reactive mesogen represented by Chemical Formula 1, <Chemical Formula 1>

$$\begin{array}{c} VA \\ | \\ X \\ | \\ R \end{array}$$

in the Chemical Formula 1, VA is

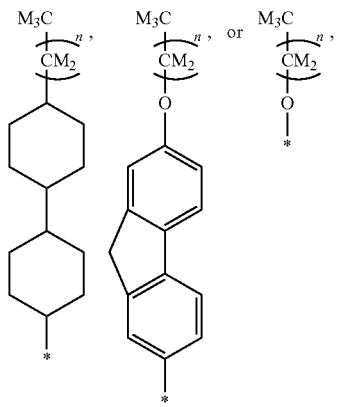

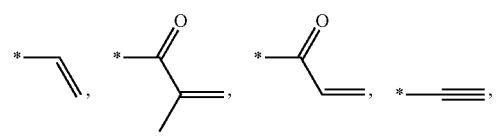

and each M is independently H, $CH_3$, $-(CH_2)CH_3$, F, Br, I, OH, $C_3H_7$, $NH_2$, or $-CN$;

R is

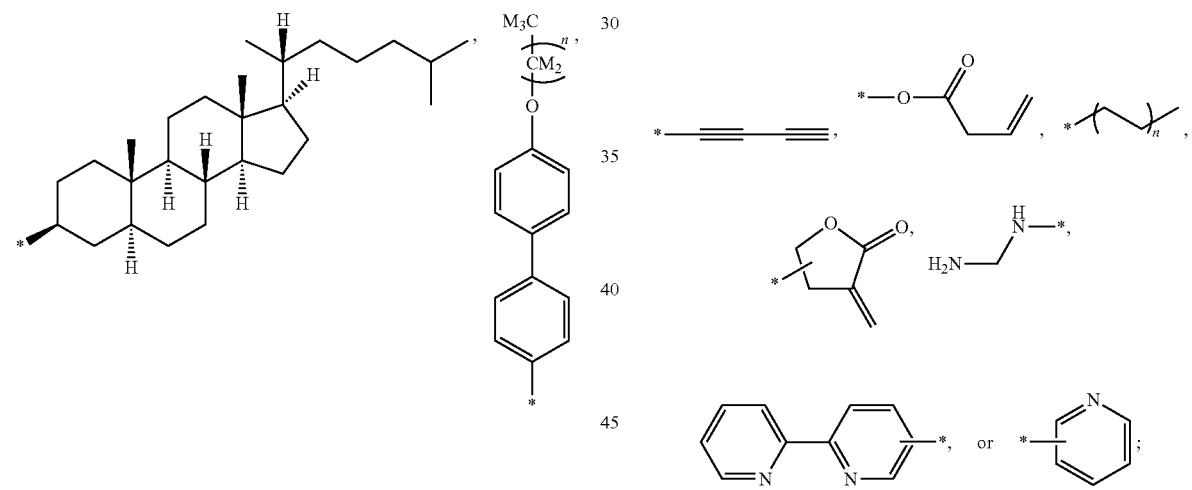

and

X is

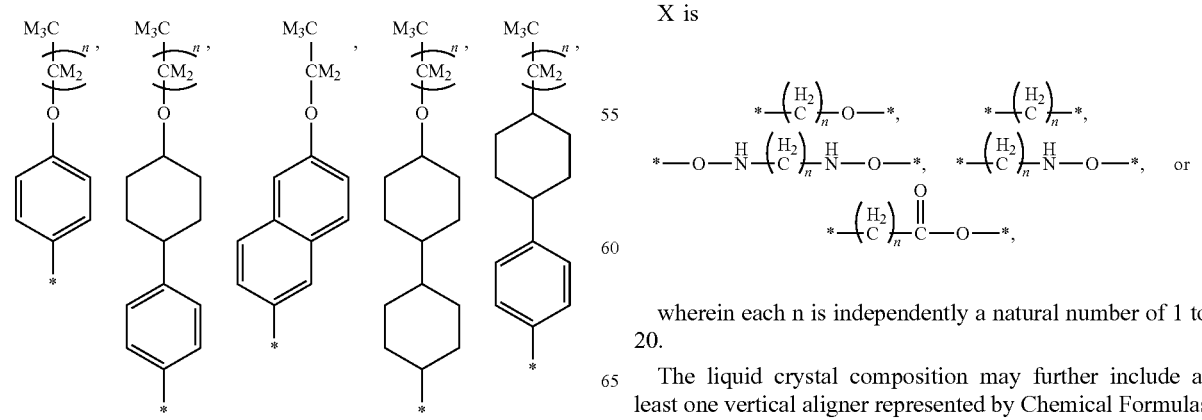

wherein each n is independently a natural number of 1 to 20.

The liquid crystal composition may further include at least one vertical aligner represented by Chemical Formulas 25 to 29 below, <Chemical Formula 25>

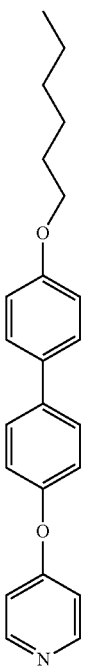

<Chemical Formula 26>

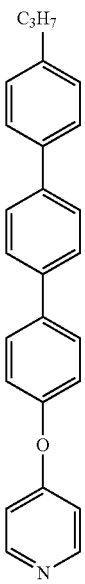

<Chemical Formula 27>

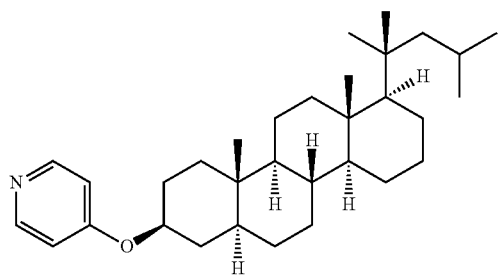

<Chemical Formula 28>

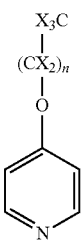

<Chemical Formula 29>

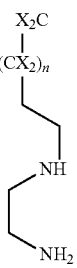

wherein in Chemical Formulas 28 and 29, each n is independently a natural number of 1 to 20, and X is H, F, Br, I, OH, $C_3H_7$, $NH_2$, or —CN.

In an exemplary embodiment, the liquid crystal composition further includes at least one vertical aligner represented by chemical formulas 30 to 43 below, <Chemical Formula 30>

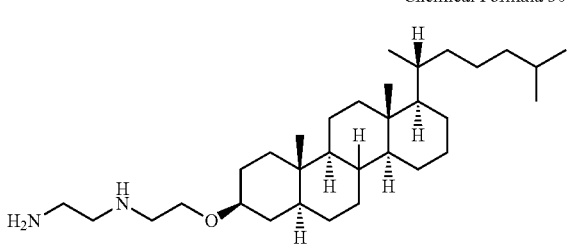

<Chemical Formula 31>

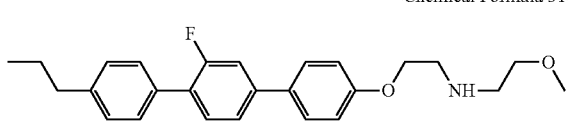

<Chemical Formula 32>

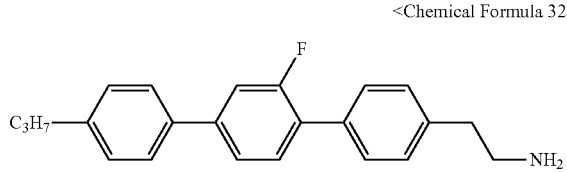

<Chemical Formula 33>

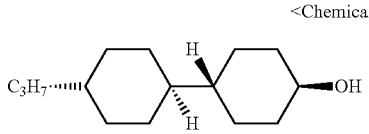

<Chemical Formula 34>

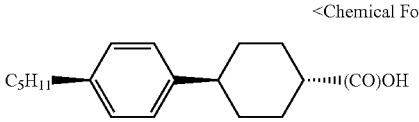

-continued

<Chemical Formula 35>

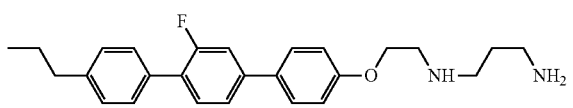

<Chemical Formula 36>

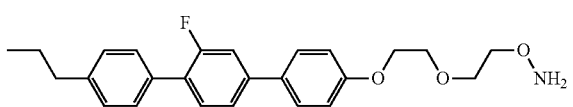

<Chemical Formula 37>

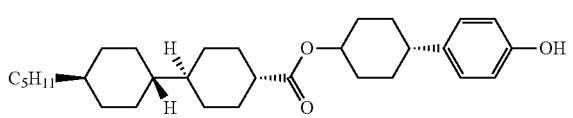

<Chemical Formula 38>

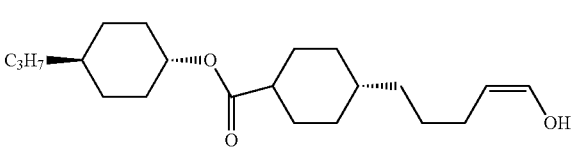

<Chemical Formula 39>

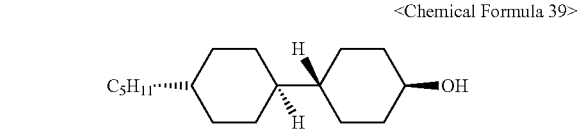

<Chemical Formula 40>

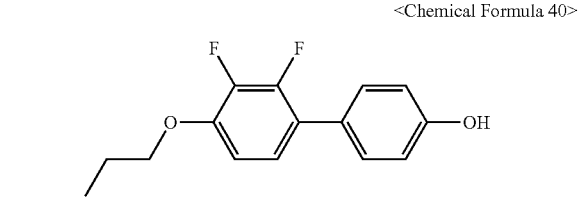

<Chemical Formula 41>

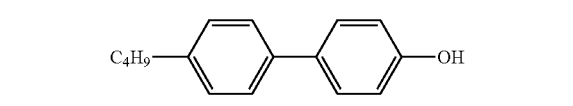

<Chemical Formula 42>

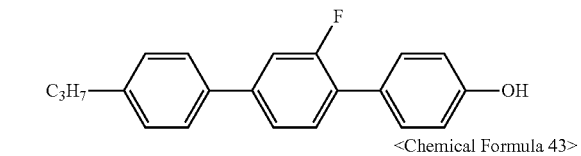

<Chemical Formula 43>

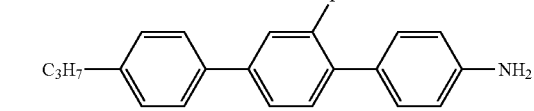

In an exemplary embodiment, injecting the liquid crystal composition may include forming a first liquid crystal alignment layer on a surface of the first substrate which faces the second substrate and forming a second liquid crystal alignment layer on a surface of the second substrate which faces the first substrate, wherein the first liquid crystal alignment layer and the second liquid crystal alignment layer are formed by one or more of the reactive mesogen and the vertical aligner.

In an exemplary embodiment, the liquid crystal display may further includes a liquid crystal layer including first liquid crystal molecules having negative dielectric anisotropy and aligned on a surface of the first liquid crystal alignment layer and second liquid crystal molecules aligned on a surface of the second liquid crystal alignment layer, wherein the first liquid crystal molecules and the second liquid crystal molecules are vertically aligned on the surface of the first substrate or on the surface of the second substrate before the irradiating of the ultraviolet rays while the electric field is applied.

In an exemplary embodiment, further including removing the electric field after the irradiating the ultraviolet rays, wherein the first liquid crystal molecules and the second liquid crystal molecules may be arranged at an incline relative to the surface of the first substrate or the surface of the second substrate after irradiating the ultraviolet rays and after removing the electric field.

In an exemplary embodiment, at least one of the first liquid crystal alignment layer and the second liquid crystal alignment layer may be a single layer formed by mixing at least one reactive mesogen represented by Chemical Formula 1 with at least one vertical aligner represented by Chemical Formulas 25 to 29.

In an exemplary embodiment, the reactive mesogen represented by Chemical Formula 1 may include a mixture of a reactive mesogen A in which R is

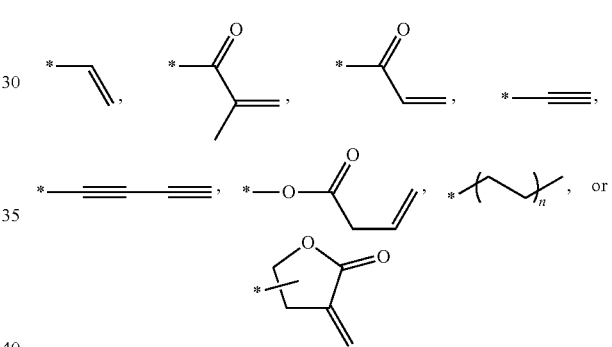

and a reactive mesogen B in which R is

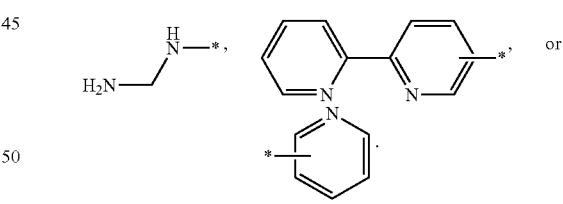

In an exemplary embodiment, the method for manufacturing a liquid crystal display may further include irradiating the ultraviolet rays when the electric field is not applied before irradiating the ultraviolet rays while the electric field is applied and after the liquid crystal composition is injected.

In an exemplary embodiment, the method for manufacturing a liquid crystal display may further include irradiating the ultraviolet rays again after the step of irradiating ultraviolet rays while the electric field is applied.

In an exemplary embodiment the liquid crystals display may further include a polymerization initiator.

In various embodiments, the liquid crystal display can include an alignment layer having superior thermal stability.

The effects according to the present invention are not limited to the contents as exemplified above, but further various effects are included in the description.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
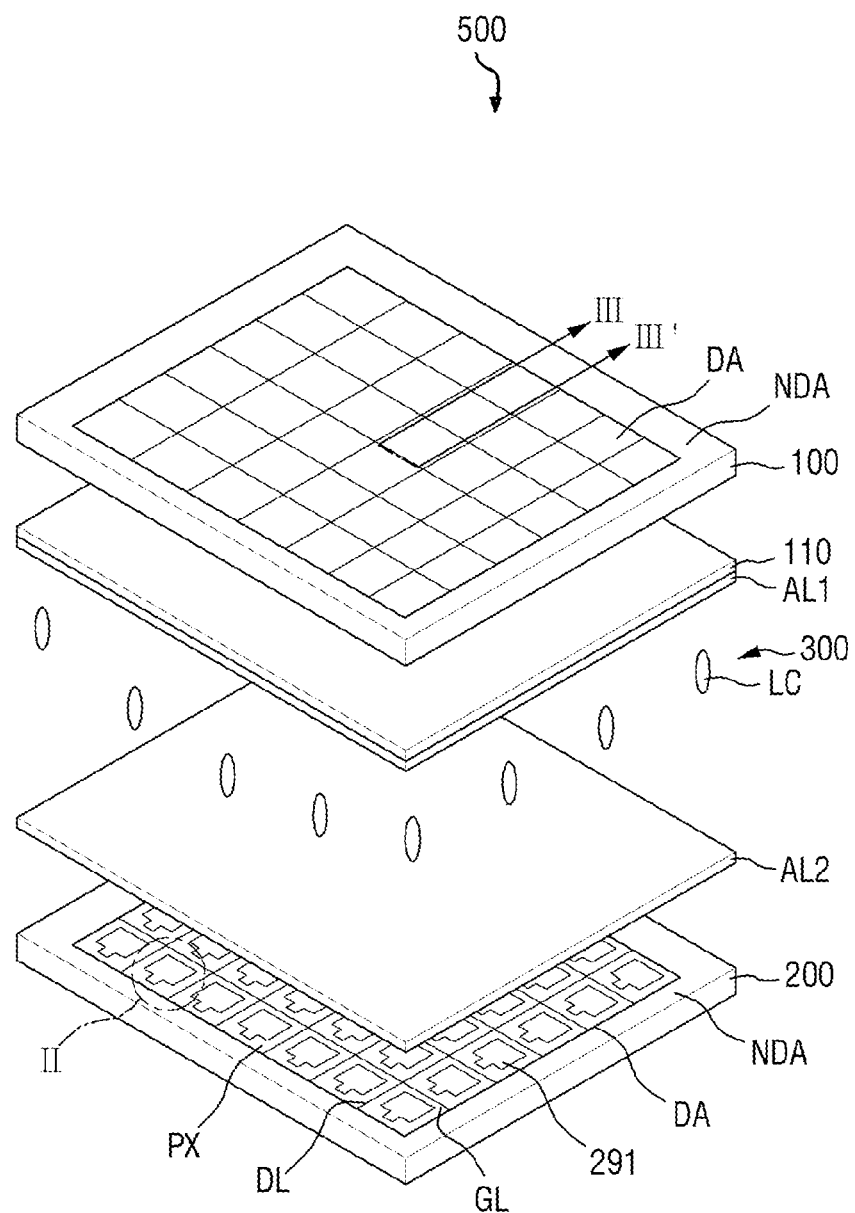
FIG. 1 is a schematic exploded perspective view of an exemplary embodiment of a liquid crystal display.

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention will only be defined by the appended claims. In the entire description of the present invention, the same reference numerals are used for the same elements across various figures. In the drawings, sizes and relative sizes of layers and areas may be exaggerated for clarity in explanation.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Although the terms first, second, third, and so forth are used to describe diverse constituent elements, such constituent elements are not limited by the terms. The terms are used only to discriminate a constituent element from another constituent element. Accordingly, in the following description, a first constituent element may be a second constituent element.

Spatially relative terms, such as "bottom," "below," "lower," "under," "above," "upper," "top" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. "Or" means "and/or." It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value."

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments will be described in detail with reference to the accompanying drawings.

Figure 2:
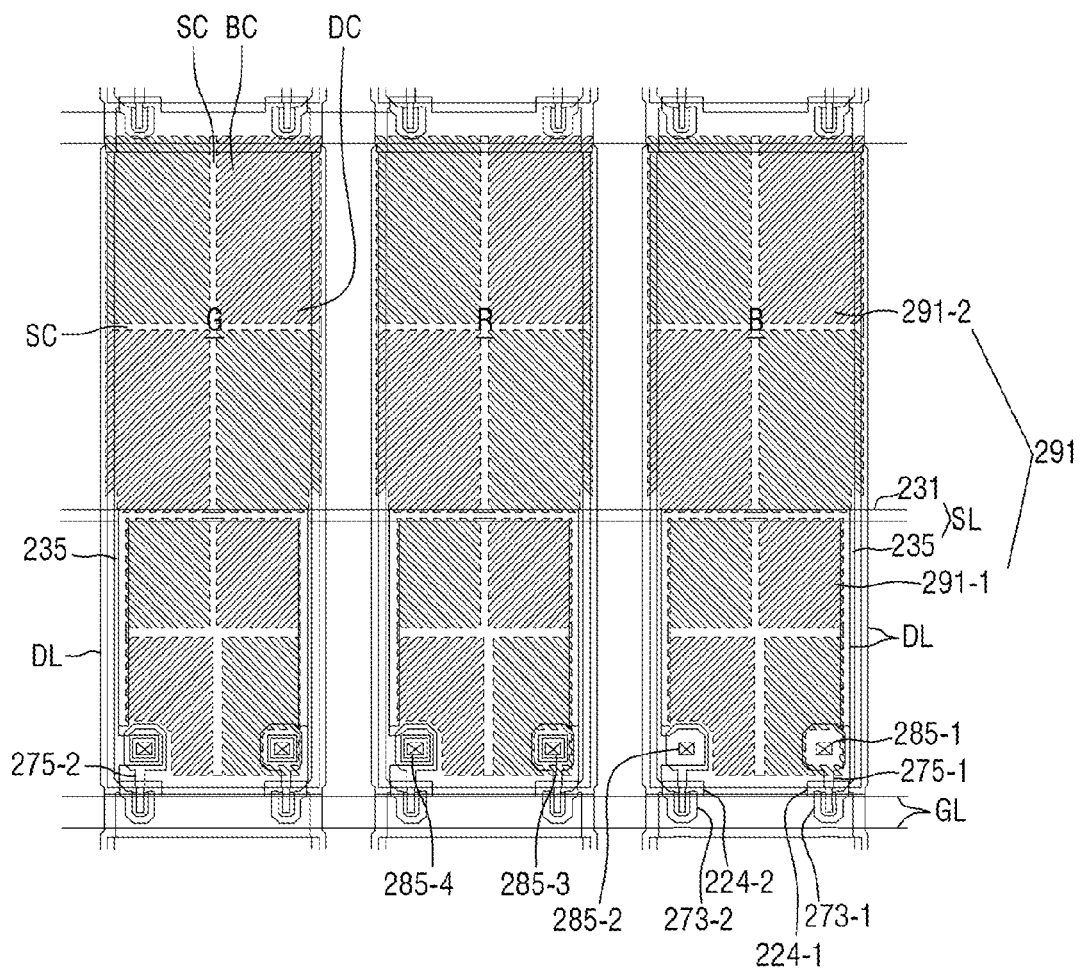
FIG. 2 is a schematic enlarged view of region II in FIG. 1.

FIG. 1 is a schematic exploded perspective view of an exemplary embodiment of a liquid crystal display 500, and FIG. 2 is a schematic enlarged view of region II in FIG. 1.

Referring to FIGS. 1 and 2, an exemplary embodiment of a liquid crystal display 500 includes a first substrate 100, a second substrate 200 spaced apart from the first substrate 100 to face the first substrate 100, and a liquid crystal layer 300 disposed between the first substrate 100 and the second substrate 200.

Each of the first and second substrates 100 and 200 includes a display region DA and a non-display region NDA. The display region DA is a region on which an image is visually recognized, and the non-display region NDA is a region on which an image is not visually recognized. The outline of the display region DA is surrounded by the non-display region NDA.

A common electrode 110 may be arranged between the first substrate 100 and the second substrate 200, and may be a patternless electrode that does not have a slit pattern. A pixel electrode 291 may be arranged between the second substrate 200 and the common electrode 110, and may be a pattern electrode having a slit pattern.

The liquid crystal layer 300 may be disposed between the common electrode 110 and the pixel electrode 291. The liquid crystal layer 300 may include liquid crystal molecules LC with negative dielectric anisotropy. A first liquid crystal alignment layer AL1 may be disposed between the common electrode 110 and the liquid crystal layer 300. A second liquid crystal alignment layer AL2 may be disposed between the pixel electrode 291 and the liquid crystal layer 300.

The second substrate 200 may be a thin film transistor substrate. In the display region DA of the second substrate 200, a plurality of gate lines GL extending in a first direction and a plurality of data lines DL extending in a second direction that is vertical to the first direction may be formed. The pixel electrode 291 may be arranged for each pixel PX that is defined by the gate line GL and the data line DL.

The pixel electrode 291 may include sub-pixel electrodes 291-1 and 291-2 which are spaced apart from each other. In an exemplary embodiment, each of the sub-pixel electrodes 291-1 and 291-2 may be in the form of a rectangular shape as a whole. Each of the sub-pixel electrodes 291-1 and 291-2 may be a pattern electrode having a slit pattern. Specifically, the slit pattern may include a distal portion DC arranged between a stem portion SC and a branch portion BC, and formed to extend from the stem portion SC. The stem portion SC may be formed in a cross (+) shape, and the branch portion BC may radially extend in a direction of about 45° from the cross (+) shaped stem portion SC.

The gate line GL may include gate electrodes 224-1 and 224-2 projecting from the gate line GL toward the pixel electrode 291 in the second direction. The plurality of data lines DL may include source electrodes 273-1 and 273-2 and drain electrodes 275-1 and 275-2. The source electrodes 273-1 and 273-2 may be formed to project from the data line DL in a "U" shape. The drain electrodes 275-1 and 275-2 may be arranged to be spaced apart from the source electrodes 273-1 and 273-2.

The pixel electrode 291 may receive a data voltage through a thin film transistor that is a switching element. The gate electrodes 224-1 and 224-2, which are control terminals of thin film transistors, may be electrically connected to the gate line GL, and the source electrodes 273-1 and 273-2, which are input terminals thereof, may be electrically connected to the data line DL through contact holes 285-1, 285-2, 285-3, and 285-4. The drain electrodes 275-1 and 275-2, which are output terminals thereof, may be electrically connected to the pixel electrode.

The pixel electrode 291 may generate an electric field together with the common electrode 110, and may control the alignment direction of the liquid crystal molecules LC of the liquid crystal layer 300 arranged between the pixel electrode 291 and the common electrode 110. The pixel electrode 291 may control the alignment directions of first liquid crystal molecules LC1 and second liquid crystal molecules LC2 through distortion of the electric field.

The thin film transistor substrate may include a laminated structure of a base substrate (not illustrated) that is made of glass or polymer, the gate electrodes 224-1 and 224-2, a gate insulating layer (not illustrated), a semiconductor layer (not illustrated), an ohmic contact layer (not illustrated), the source electrodes 273-1 and 273-2, the drain electrodes 275-1 and 275-2, a passivation layer (not illustrated), and an organic layer (not illustrated).

A channel of the thin film transistor may be formed through the semiconductor layer (not illustrated). The semiconductor layer (not illustrated) may be arranged to overlap the gate electrodes 224-1 and 224-2. The respective source electrodes 273-1 and 273-2 may be spaced apart from the respective drain electrodes 275-1 and 275-2 on the basis of the semiconductor layer (not illustrated).

A storage electrode line SL may include a stem line 231 arranged substantially in parallel to the plurality of gate lines GL and a plurality of branch lines 235 extending from the stem line 231. The storage electrode line SL may be omitted, and the shape and the arrangement of the storage electrode line SL may be diversely modified.

The non-display region NDA may be a light blocking region that surrounds the display region DA as a peripheral portion of the display region DA. In the non-display region NDA of the second substrate 200, a driving portion (not illustrated), which provides a gate driving signal and a data driving signal to each pixel PX of the display region DA, may be arranged. The gate line GL and the data line DL may extend from the display region DA to the non-display region NDA, and may be electrically connected to the driving unit (not illustrated).

The first substrate 100 may be an opposite substrate to the second substrate 200. The common electrode 110 may be arranged on the second substrate 200.

A color filter layer (not illustrated) may be formed in a region that corresponds to each pixel in the display region DA, and may include a red color filter R, a green color filter G, and a blue color filter B. The color filter layer may be included in any one of the first substrate 100 and the second substrate 200. For example, in the case where the first substrate 100 includes the color filter layer, the first substrate 100 may have a laminated structure of a base substrate (not illustrated) that is made of glass or polymer, the color filter layer, and an overcoat layer (not illustrated). The overcoat layer may be a planarization layer that covers the color filter layer. In this case, the common electrode 110 may be arranged on the overcoat layer.

For example, in the case where the second substrate 200 includes the color filter layer, the second substrate 200 may have a color-filter-on-array (COA) structure in which the color filters are formed on a transparent insulating substrate on which the thin film transistors are formed. For example, the color filter layer may be arranged between the passivation layer (not illustrated) that covers the source electrodes 273-1 and 273-2 and the drain electrodes 275-1 and 275-2 and the organic layer (not illustrated).

A light-blocking pattern layer (not illustrated) may be arranged on boundaries among the respective color filters R, G, and B. The light-blocking pattern layer may be included in any one of the first substrate 100 and the second substrate 200. For example, the light-blocking pattern layer may be a black matrix.

Figure 3:
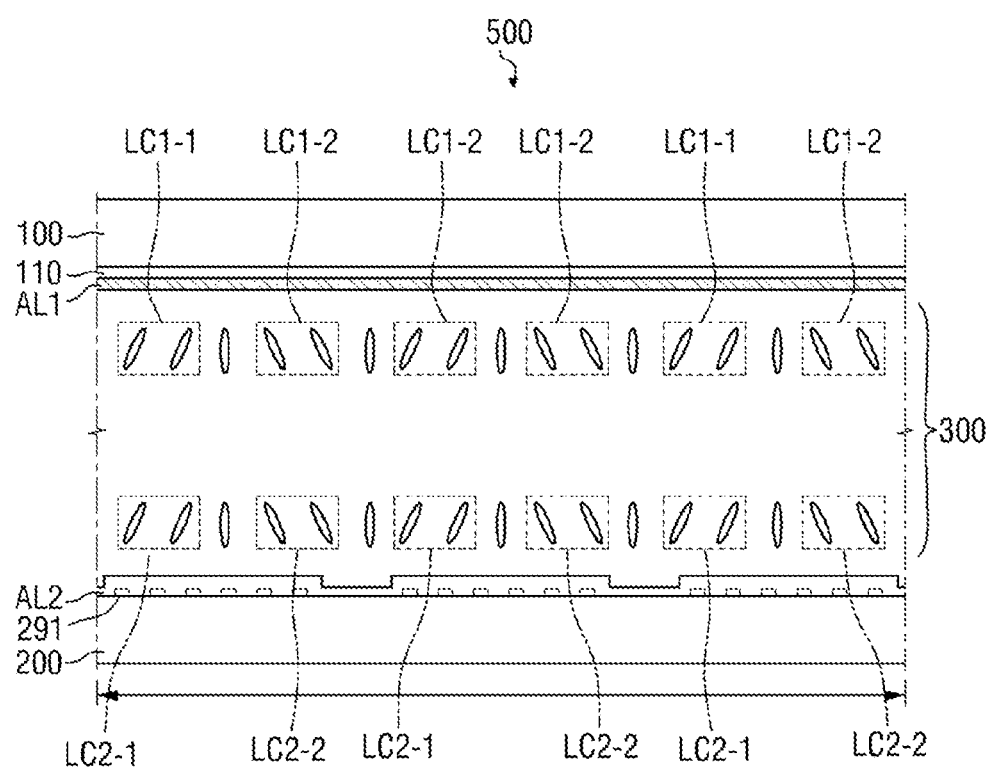
FIG. 3 is a cross-sectional view of line in FIG. 1.

FIG. 3 is a schematic cross-sectional view taken along line III-III' of FIG. 1. Hereinafter, referring to FIG. 3, an exemplary embodiment of a liquid crystal display 500 will be described in more detail. FIG. 3 schematically illustrates the alignment state of liquid crystal molecules LC1-1, LC2-1 and LC2-2 in an initial state where an electric field is not applied to the liquid crystal display 500.

Referring to FIG. 3, the first liquid crystal molecules LC1-1 and LC1-2 may be aligned on the surface of a first liquid crystal alignment layer AL1, and the second liquid crystal molecules LC2-1 and LC2-2 may be aligned on the surface of a second liquid crystal alignment layer AL2. Further, the first liquid crystal molecules LC1-1 and LC1-2 and the second liquid crystal molecules LC2-1 and LC2-2 may be arranged to have a predetermined inclination on the surfaces of the first liquid crystal alignment layer AL1 and the second liquid crystal alignment layer AL2, respectively.

For example, in the initial state where the electric field is not applied to the liquid crystal display 500, two or more domains having liquid crystal molecules in different alignment directions from each other, like the (1-1)-th liquid crystal molecules LC1-1 and the (1-2)-th liquid crystal molecules LC1-2, may be formed on the surface of the first liquid crystal alignment layer AL1. In the same manner, two or more domains having liquid crystal molecules in different alignment directions from each other, like the (2-1)-th liquid crystal molecules LC2-1 and the (2-2)-th liquid crystal molecules LC2-2, may be formed on the surface of the second liquid crystal alignment layer AL2.

The domain direction of the first liquid crystal molecules LC1-1 and LC1-2 that form the domain on the surface of the first liquid crystal alignment layer AL1, may correspond to the domain direction of the second liquid crystal molecules LC2-1 and LC2-2 that form the domain on the surface of the second liquid crystal alignment layer AL2. That is, along the same vertical line, the inclination directions of the first liquid crystal molecules LC1-1 and LC1-2 on the surface of the first liquid crystal alignment layer AL1 may be equal to the inclination directions of the second liquid crystal molecules LC2-1 and LC2-2 on the surface of the second liquid crystal alignment layer AL2.

More specifically, on the first liquid crystal alignment layer AL1, the (1-1)-th liquid crystal molecules LC1-1 may be aligned in the first inclination direction, and the (1-2)-th liquid crystal molecules LC1-2 may be aligned in the second inclination direction. On the other hand, on the second liquid crystal alignment layer AL2 in a corresponding position on the vertical line, the (2-1)-th liquid crystal molecules LC2-1 may be aligned in the first inclination direction, and the (2-2)-th liquid crystal molecules LC2-2 may be aligned in the second inclination direction. The first inclination direction may be roughly in a direction of $-\alpha°$ with reference to a virtual straight line that is vertical to the first liquid crystal alignment layer LA1 or the second liquid crystal alignment layer LA2, and the second inclination direction may be roughly in a direction of $+\alpha°$ with reference to the virtual straight line. Here, a is a positive real number.

In an exemplary embodiment, at least one of the first liquid crystal alignment layer AL1 and the second liquid crystal alignment layer AL2 may include a reactive mesogen represented by Chemical Formula 1 below.

<Chemical formula 1>

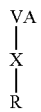

In the Chemical Formula 1, the group VA is

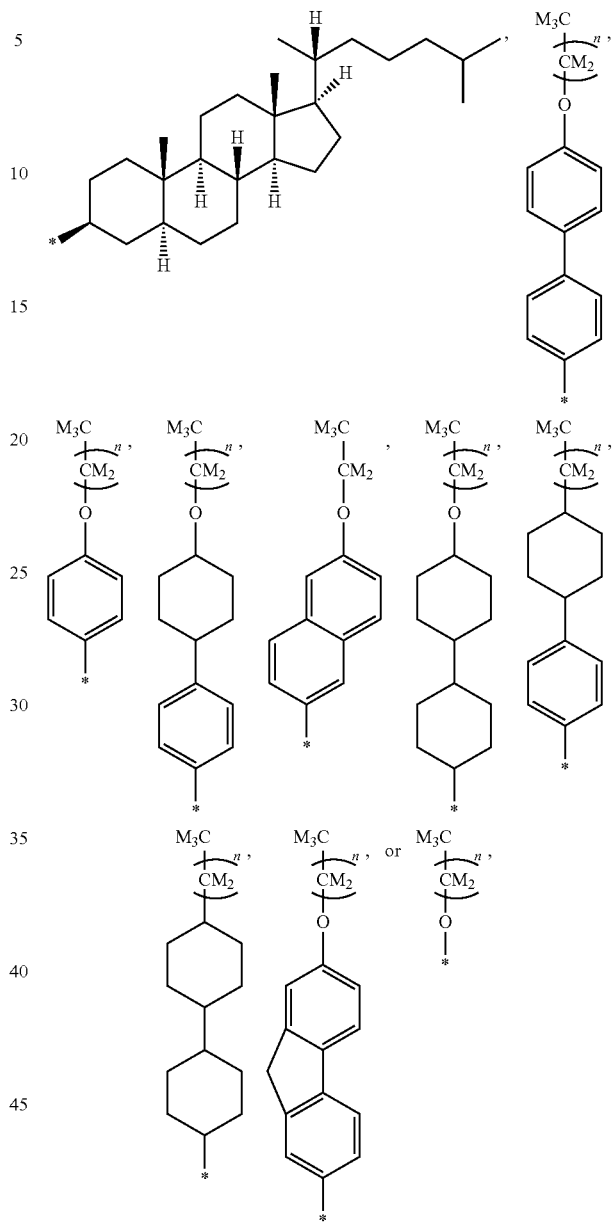

where each M is independently H, CH$_3$, —(CH$_2$)nCH$_3$, F, Br, I, OH, C$_3$H$_7$, NH$_2$, or —CN.

R is

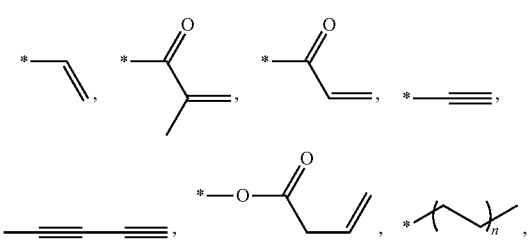

-continued

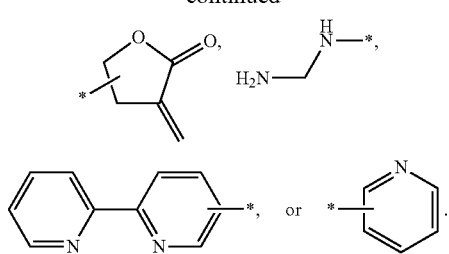

X is

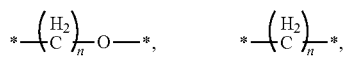

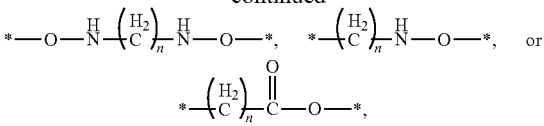

Here, each n is independently a natural number of 1 to 20.

Due to the presence of the reactive mesogen, the liquid crystals LC1-1, LC1-2, LC2-1 and LC2-2 that are positioned on the surfaces of the first liquid crystal alignment layer AL1 and the second liquid crystal alignment layer AL2 can be vertically aligned, and the line inclination can be implemented. Further, when the reactive mesogen is added together with vertical aligners, thermal stability can be improved.

More specifically, the reactive mesogen represented in Chemical Formula 1 may be at least one of Chemical Formulas 2 to 24 below.

<Chemical Formula 2>

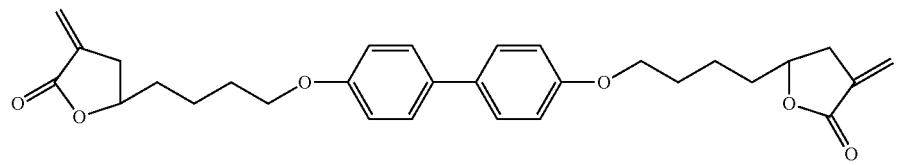

<Chemical Formula 3>

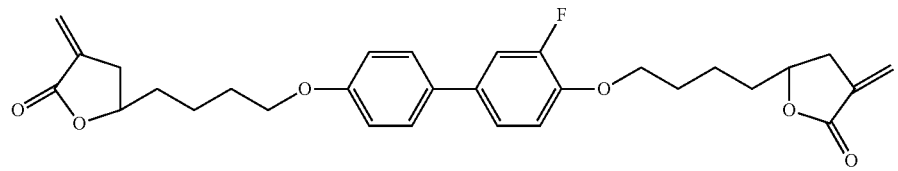

<Chemical Formula 4>

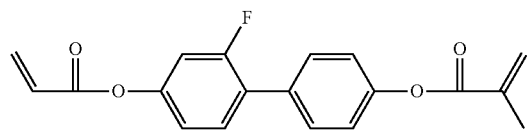

<Chemical Formula 5>

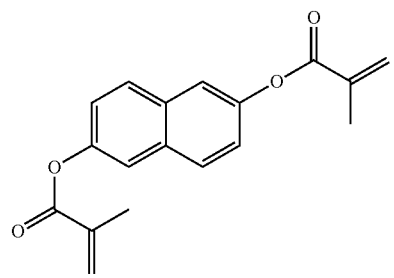

<Chemical Formula 6>

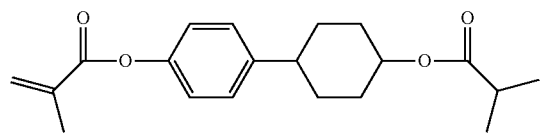

<Chemical Formula 7>

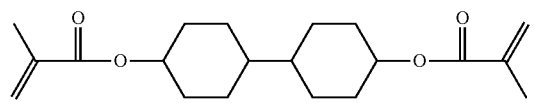

<Chemical Formula 8>

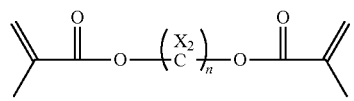

<Chemical Formula 9>

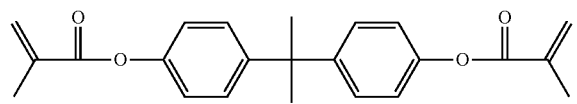

<Chemical Formula 10>

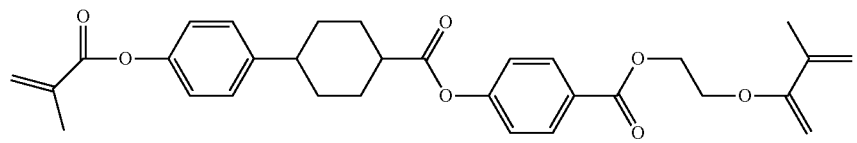

<Chemical Formula 11>
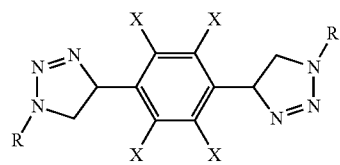
<Chemical Formula 12>
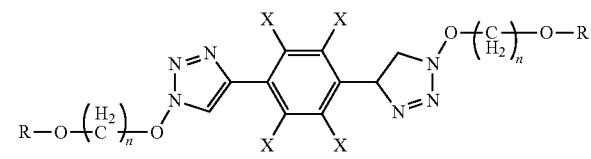
<Chemical Formula 13>
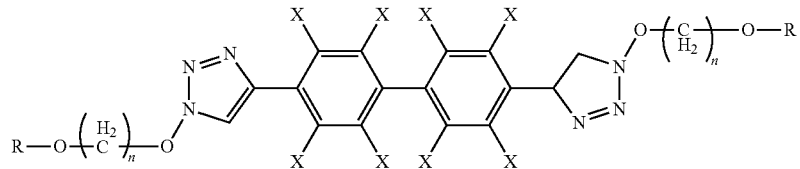
<Chemical Formula 14>
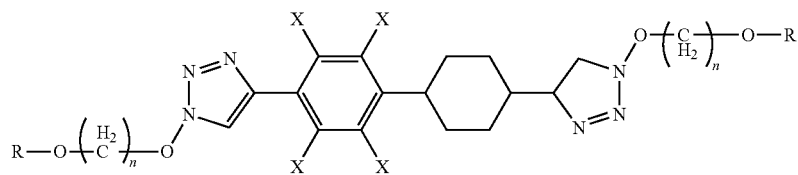
<Chemical Formula 15>
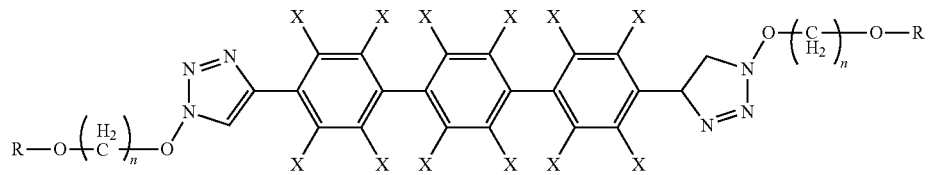
<Chemical Formula 16>
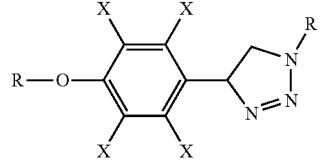
<Chemical Formula 17>
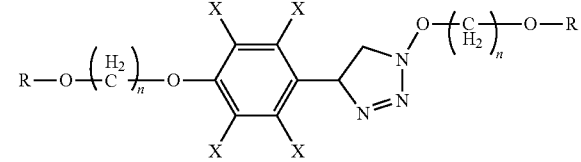
<Chemical Formula 18>
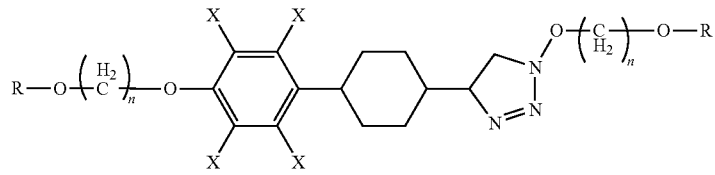
<Chemical Formula 19>
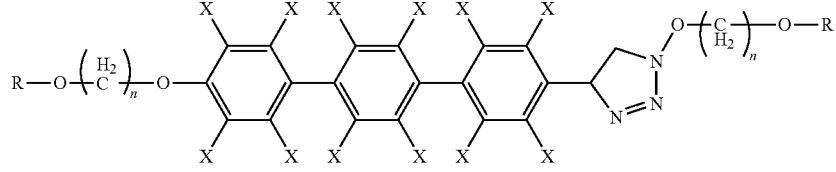
<Chemical Formula 20>
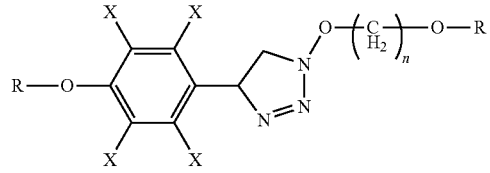
<Chemical Formula 21>
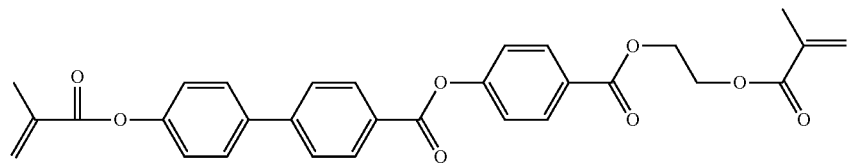

<Chemical Formula 22>

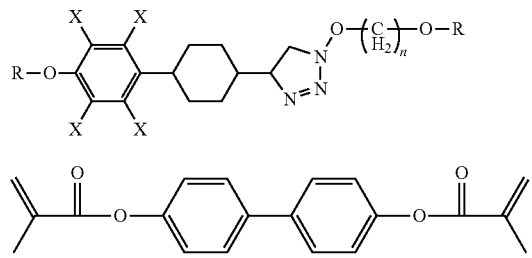

<Chemical Formula 23>

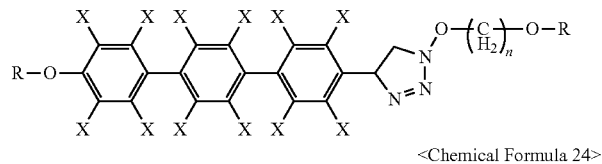

In the above chemical formulas, each X is independently H, $CH_3$, —$(CH_2)_n CH_3$, F, Br, I, OH, $C_3H_7$, $NH_2$, or —CN, each n is independently a natural number of 1 to 20, and R is

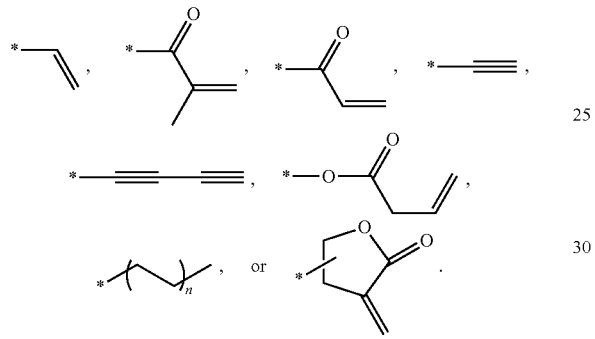

On the other hand, at least one of the first liquid crystal alignment layer AL1 and the second liquid crystal alignment layer AL2 may further include one or more vertical aligner represented by Chemical Formulas 25 to 29 below.

<Chemical Formula 25>

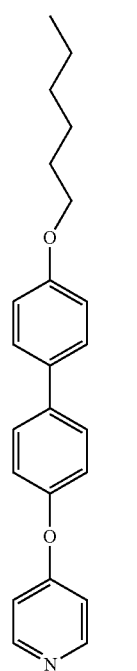

<Chemical Formula 24>

<Chemical Formula 26>

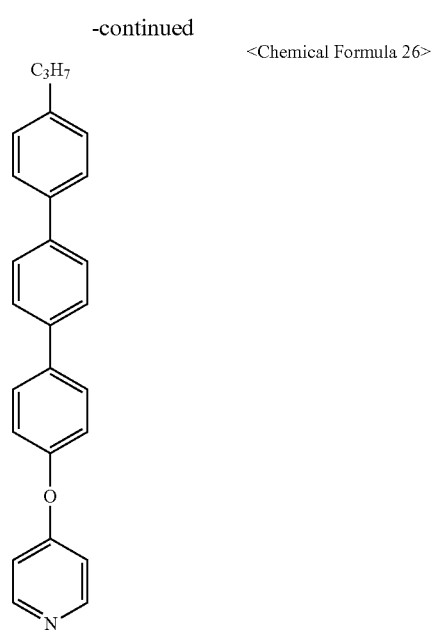

<Chemical Formula 27>

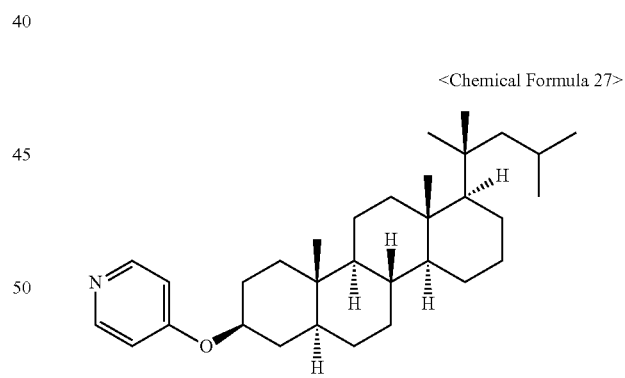

<Chemical Formula 28>

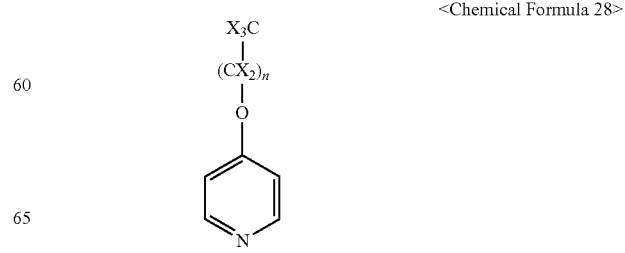

-continued

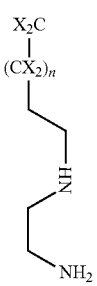
<Chemical Formula 29>

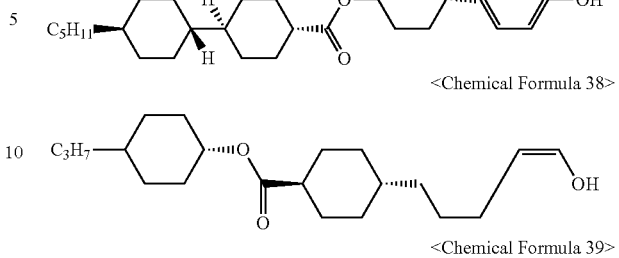
<Chemical Formula 37>

<Chemical Formula 38>

<Chemical Formula 39>

In the Chemical Formulas 28 and 29 as described above, each n is independently a natural number of 1 to 20, and X is H, F, Br, I, OH, $C_3H_7$, $NH_2$, or —CN.

At least one of the first liquid crystal alignment layer AL1 and the second liquid crystal alignment layer AL2 may further include one or more vertical aligner represented by to Chemical Formulas 30 to 43 below.

<Chemical Formula 30>

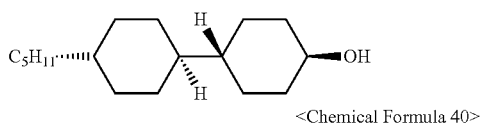

<Chemical Formula 40>

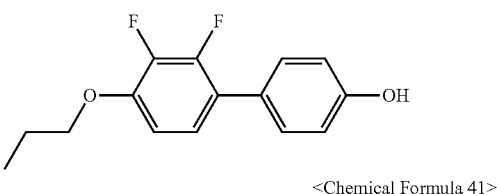

<Chemical Formula 41>

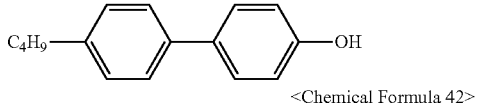

<Chemical Formula 42>

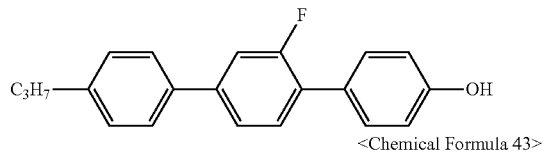

<Chemical Formula 43>

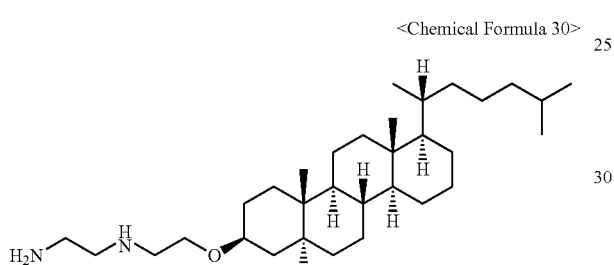

<Chemical Formula 31>

<Chemical Formula 32>

<Chemical Formula 33>

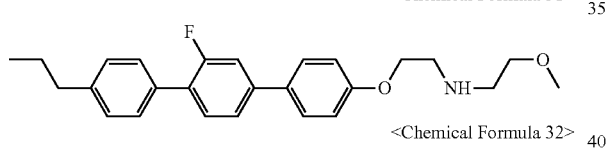

<Chemical Formula 34>

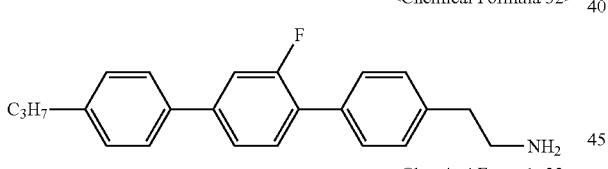

<Chemical Formula 35>

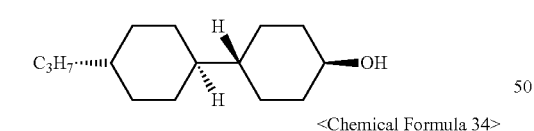

<Chemical Formula 36>

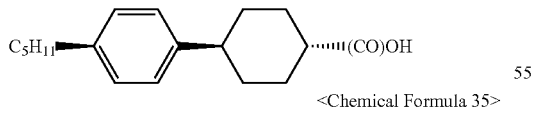

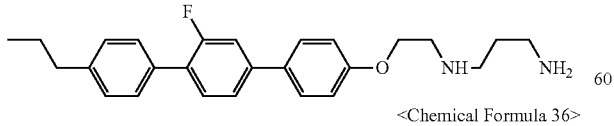

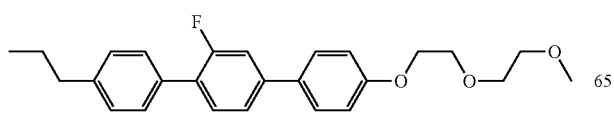

The vertical aligners may be included in the liquid crystals in addition to the reactive mesogens, and may vertically align the liquid crystal molecules LC1-1, LC1-2, LC2-1 and LC2-2 that exist on the surfaces of the first liquid crystal alignment layer AL1 and the second liquid crystal alignment layer AL2. Since the reactive mesogens are added together with the vertical aligners, thermal stability can be heightened.

On the other hand, when the reactive mesogen represented by the Chemical Formula 1 is included in both the first liquid crystal alignment layer AL1 and the second liquid crystal alignment layer AL2, it becomes possible to implement the vertical alignment and the line inclination of the liquid crystal molecules LC1-1, LC1-2, LC2-1 and LC2-2.

At least one of the first liquid crystal alignment layer AL1 and the second liquid crystal alignment layer AL2 may further include a polymerization initiator to facilitate polymerization of the reactive mesogen. The polymerization initiator is not limited and may be any polymerization inhibitor known in the art.

The reactive mesogen represented by the Chemical Formula 1 may include a mixture of a reactive mesogen A and a reactive mesogen B having different R groups. In an exemplary embodiment, the reactive mesogen of Chemical Formula 1 is a mixture of reactive mesogen A in which R is

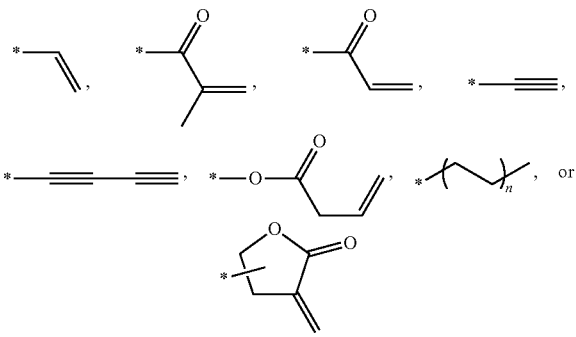

and reactive mesogen B in which R is

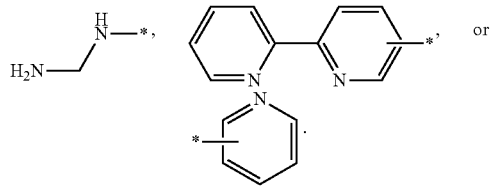

The reactive mesogen A may be self-polymerized (i.e. a homopolymer), or alternatively, reactive mesogen A may be co-polymerized with the vertical aligner on the first substrate 100 or the vertical aligner on the second substrate 200 to heighten the thermal stability of the first liquid crystal alignment layer AL1 or the second liquid crystal alignment layer AL2. Reactive mesogen B may help vertical alignment of the liquid crystal molecules LC1-1, LC1-2, LC2-1 and LC2-2 on the first liquid crystal alignment layer AL1 or the second liquid crystal alignment layer AL2 together with the vertical aligner.

At least one of the first liquid crystal layer AL1 and the second liquid crystal layer AL2 may be formed as a single layer. That is, at least one of the first liquid crystal alignment layer AL1 and the second liquid crystal alignment layer AL2 may be a single layer formed by mixing at least one reactive mesogen represented by the Chemical Formula 1 with at least one vertical aligner represented by the Chemical Formulas 25 to 29 or at least one vertical aligner represented by the Chemical Formulas 30 to 43, but is not limited thereto. The first liquid crystal alignment layer AL1 and the second liquid crystal alignment layer AL2 may also be formed as a multilayer. The multilayer may be formed in a manner in which a vertical aligners layer is first formed on the common electrode 110 on a lower portion of the first substrate 100, or on an upper portion of the second substrate 200 and the pixel electrode 291, and a layer in which the reactive mesogen is polymerized is formed on the upper portion of the layer including the vertical aligners. Or alternatively, a layer including both the vertical aligner and the reactive mesogen are applied on the common electrode 110 on the lower portion of the first substrate 100, or on the upper portion of the second substrate 200 and the pixel electrode 291, and a layer in which the reactive mesogen is polymerized is formed on the upper portion thereof to form the multilayer.

In exemplary embodiments, a method for manufacturing the liquid crystal device 500 is provided. FIGS. 4 to 9 are cross-sectional views schematically illustrating a exemplary embodiment of the method for manufacturing a liquid crystal display 500.

Hereinafter, referring to FIGS. 4 to 9, an exemplary method for manufacturing a liquid crystal device 500 will be described.

Figure 4:
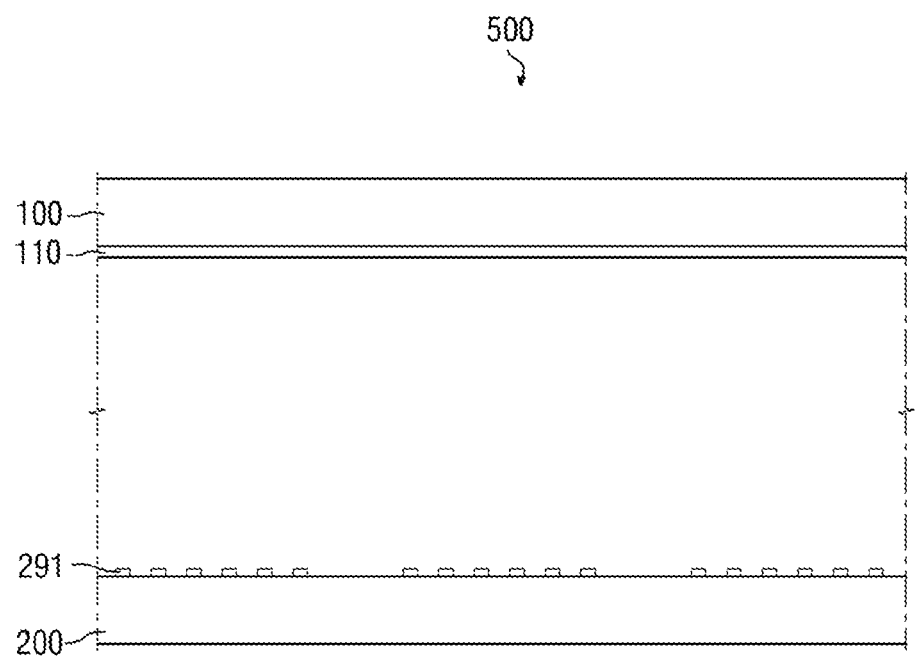
FIGS. 4 to 9 are cross-sectional views schematically illustrating an exemplary embodiment of a method for manufacturing a liquid crystal display.

Referring to FIG. 4, the first substrate 100 is arranged to face the second substrate 200 with a predetermined cell gap maintained. In exemplary embodiments, the second substrate 200 may be a thin film transistor substrate, and the first substrate 100 may be a color filter substrate.

The common electrode 110 may be arranged on the lower portion of the first substrate 100, that is, on the surface that faces the second substrate 200. The common electrode 110 may be include at least one of indium tin oxide (ITO), indium zinc oxide (IZO), indium oxide, zinc ozide, tin oxide, gallium oxide, titanium oxide, aluminum, silver, platinum, chrome, molybdenum, tantalum, niobyum, zinc, magnesium, an alloy thereof, and a laminated layer to thereof. The common electrode 110 may be a patternless electrode that does not have a slit pattern.

The pixel electrode 291 may be arranged on the second substrate 200. The pixel electrode 291 may include at least one of indium tin oxide, indium zinc oxide, indium oxide, zinc ozide, tin oxide, gallium oxide, titanium oxide, aluminum, silver, platinum, chrome, molybdenum, tantalum, niobyum, zinc, magnesium, an alloy thereof, and a laminated layer thereof. As described above, the pixel electrode 291 may be a pattern electrode that has a slit pattern, and a portion of the second substrate 200 may be exposed through the slit pattern of the pixel electrode 291.

Figure 5:
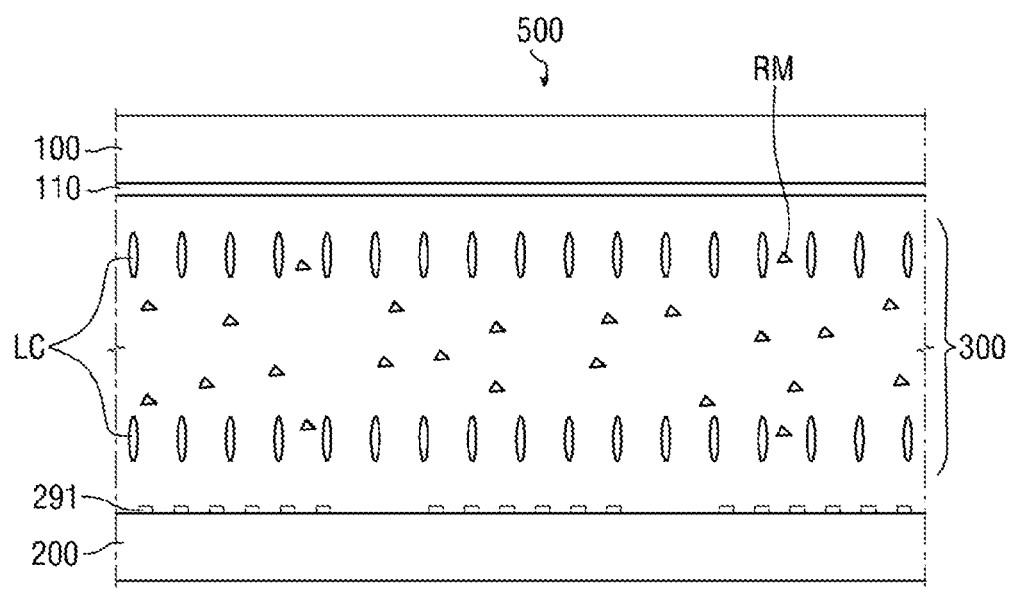

Referring to FIG. 5, the liquid crystal layer 300 is disposed between the first substrate 100 and the second substrate 200, which are disposed to face each other. That is, liquid crystals LC may be injected between the first substrate 100 and the second substrate 200 to form the liquid crystal layer 300. More specifically, the liquid crystal layer 300 may be formed through a process of injecting or loading a liquid crystal composition that includes liquid crystal molecules LC1 and LC2 between the first substrate 100 and the second substrate 200. The liquid crystal composition may further include the reactive mesogen represented by Chemical Formula 1 described above. Thus, the liquid crystal layer 300 may also include the reactive mesogen represented by the Chemical Formula 1.

Further, the liquid crystal composition may additionally include the vertical aligner represented by Chemical Formulas 25 to 29 or the vertical aligner represented by Chemical Formulas 30 to 43. In the process of injecting the liquid crystal composition, the first liquid crystal alignment layer AL1 and the second liquid crystal alignment layer AL2 may be formed by one or more of the reactive mesogen RM and the vertical aligner. The liquid crystal composition may further include a polymerization initiator to facilitate polymerization of the first liquid crystal alignment layer AL1 and the second liquid crystal alignment layer AL2.

Figure 6:
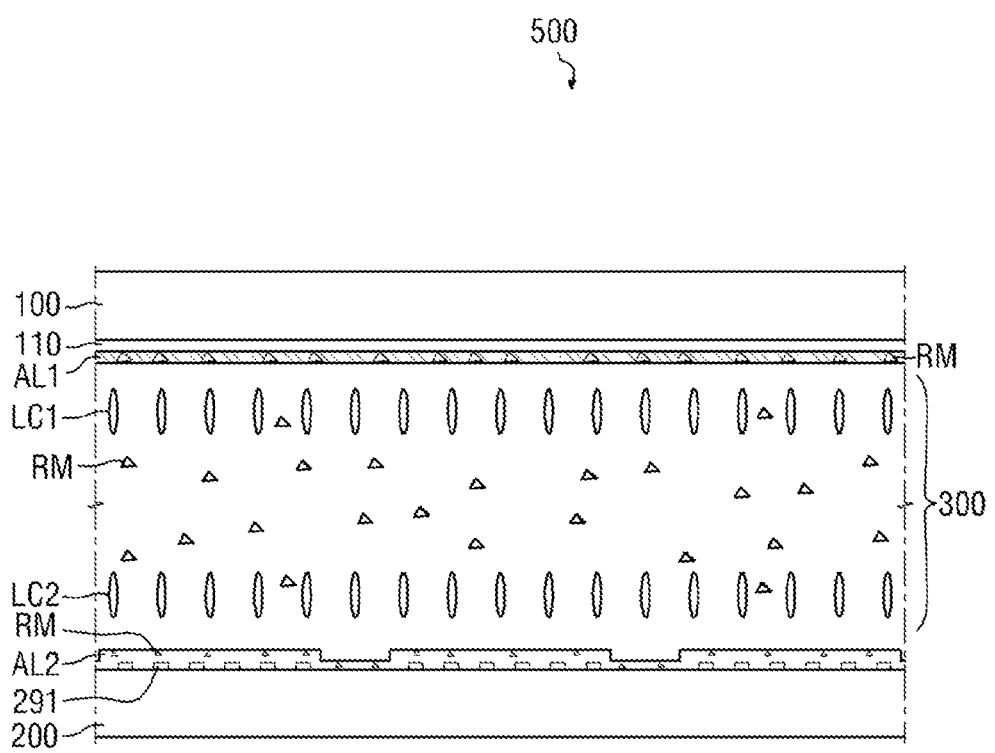
Figure 7:
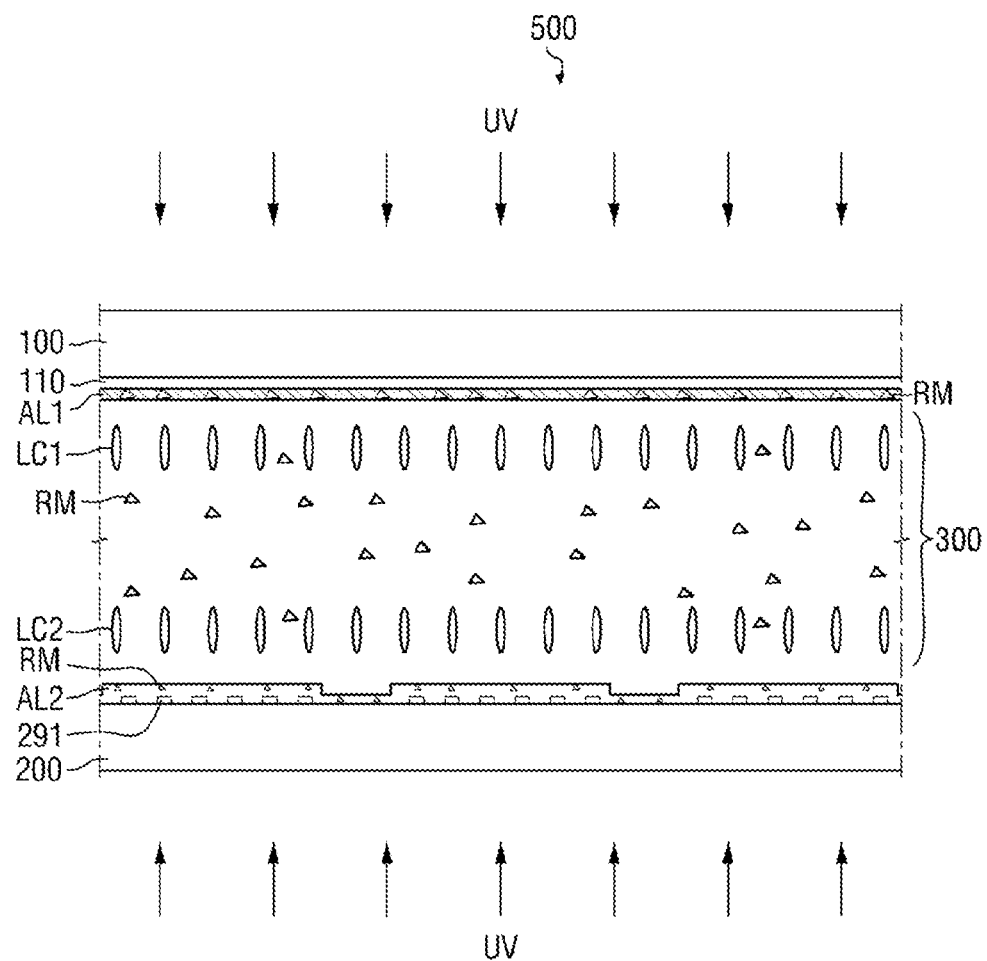

As shown in FIG. 6, the first liquid crystal alignment layer AL1 and the second liquid crystal alignment layer AL2 may be spontaneously formed in the process of injecting the liquid crystal composition. In addition, as shown in FIG. 7, in order to facilitate the polymerization of the first liquid crystal alignment layer AL1 and the second liquid crystal alignment layer AL2, ultraviolet (UV) rays may be irradiated toward the first substrate 100 and the second substrate 200 in a non electric field state (i.e. no electric field is applied).

However, this is merely exemplary, and the step of irradiating the UV rays in the non electric field state may be omitted.

In an exemplary embodiment, the liquid crystal molecules LC1 and LC2 may have negative dielectric anisotropy. In the initial state where the electric field is not applied to the to liquid crystal display 500, the liquid crystal molecules LC1 and LC2 may be substantially vertically aligned with respect to the first substrate 100 and the second substrate 200. In other words, in the initial state where the electric field is not applied to the liquid crystal display 500, it is possible to substantially vertically align the liquid crystal molecules LC1 and LC2 with respect to the first substrate 100 and the second substrate 200. In this case, the term "substantially vertically aligned" means that the liquid crystal molecules LC1 and LC2 are aligned within a range that is equal to or higher than about 87.5° and equal to or lower than about 90° with respect to the plane formed by the first substrate 100 and the second substrate 200.

Figure 8:
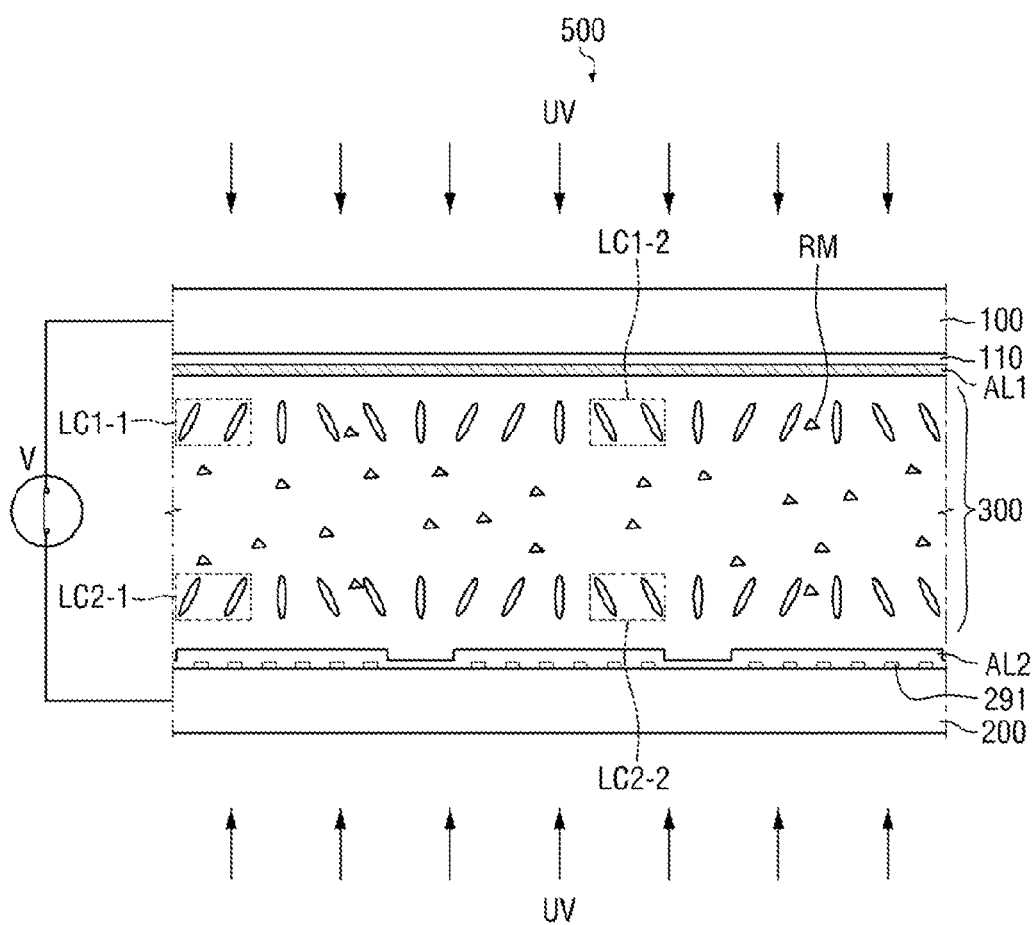

Next, as shown in FIG. 8, when the electric field is applied to the liquid crystal display 500, the liquid crystal molecules LC1-1, LC1-2, LC2-1 and LC2-2 may be aligned at an incline in a direction vertical to the electric field formed between the common electrode 110 and the pixel electrode 291. That is, the (1-1)-th liquid crystal molecules LC1-1 and the (2-1)-th liquid crystal molecules LC2-1 may be aligned in the first inclination direction, and the (1-2)-th liquid crystal molecules LC1-2 and the (2-2)-th liquid crystal molecules LC2-2 may be aligned in the second inclination direction. Thereafter, by irradiating the liquid crystal display 500 with the ultraviolet (UV) rays while the electric field is applied, polymerization of the reactive mesogens RM contained in the first liquid crystal alignment layer AL1 and the second liquid crystal alignment layer AL2 may be initiated. Accordingly, the (1-1)-th liquid crystal molecules LC1-1 and the (2-1)-th liquid crystal molecules LC2-1 are aligned in the first inclination direction, and the (1-2)-th liquid crystal molecules LC1-2 and the (2-2)-th liquid crystal molecules LC2-2 are aligned in the second inclination direction.

As the UV irradiation proceeds, the content of the reactive mesogen RM in the liquid crystal layer 300 may be gradually reduced. It can be understood that the reactive mesogen RM is reduced as the reactive mesogen RM is used to form the first liquid crystal alignment layer AL1 or the second liquid crystal alignment layer AL2.

The first liquid crystal alignment layer AL1 or the second liquid crystal alignment layer AL2 may fix or stabilize the alignment direction of the first liquid crystal molecules LC1-1 and LC1-2 and the second liquid crystal molecules LC2-1 and LC2-2. Accordingly, even when the electric field that is applied to the liquid crystal display 500 is removed, the first liquid crystal molecules LC1-1 and LC1-2 and the second liquid crystal molecules LC2-1 and LC2-2, which are aligned on the surface of the first liquid crystal alignment layer AL1 or the second liquid crystal alignment layer AL2, can maintain their inclination alignment.

Figure 9:
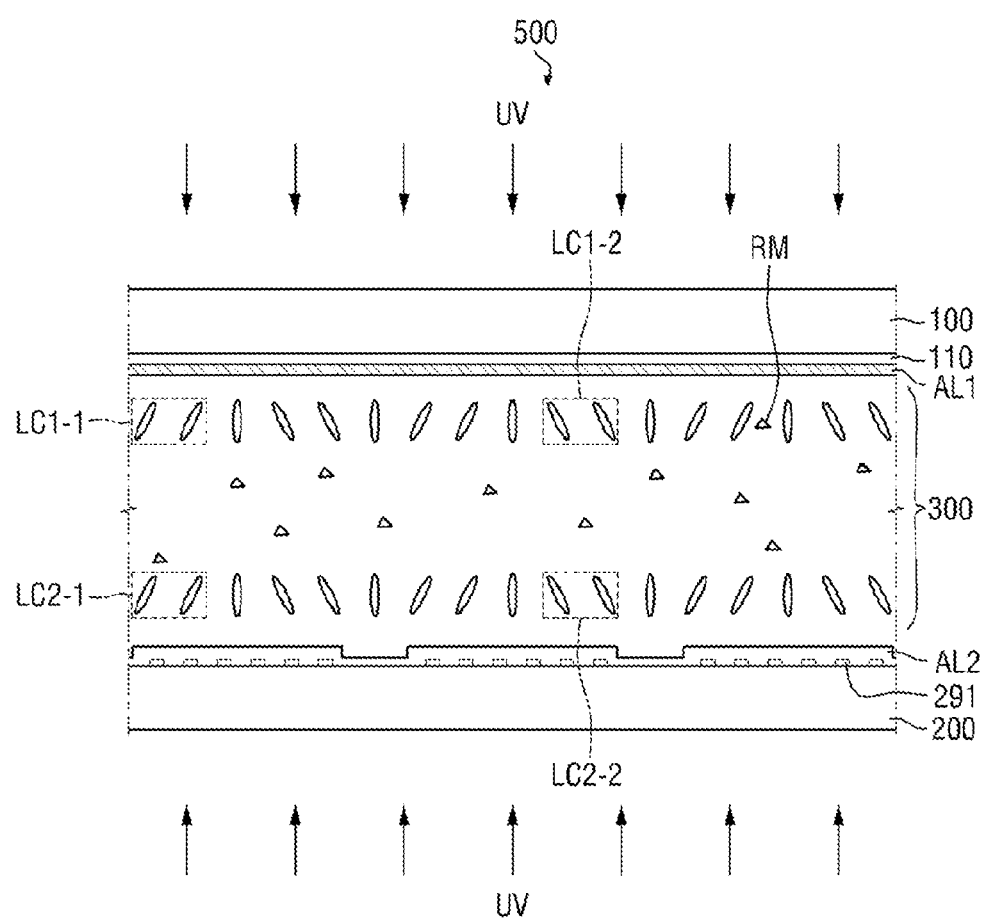

Referring to FIG. 9, the remaining reactive mesogen RM may be removed by further irradiating the liquid crystal device 500 with UV rays in a state where the electric field is not applied to the liquid crystal display 500. That is, following the irradiation of UV rays in the absence of the electric field, the reactive mesogen which does not react and remains in the liquid crystal layer 300 can be removed.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A liquid crystal display comprising:

a first substrate;

a second substrate facing the first substrate;

a liquid crystal layer disposed between the first substrate and the second substrate;

a first liquid crystal alignment layer disposed between the liquid crystal layer and the first substrate; and a second liquid crystal alignment layer disposed between the liquid crystal layer and the second substrate, wherein at least one of the first liquid crystal alignment layer and the second liquid crystal alignment layer comprise a reactive mesogen represented by Chemical Formula 1, <Chemical Formula 1>

$$\begin{array}{c} VA \\ | \\ X \\ | \\ R \end{array}$$

wherein in the chemical formula 1, VA is

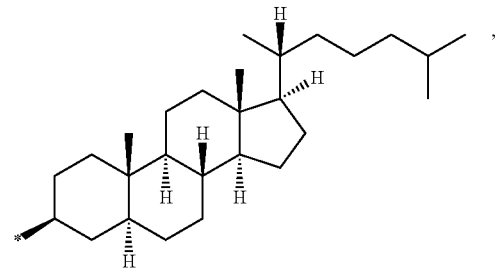

,

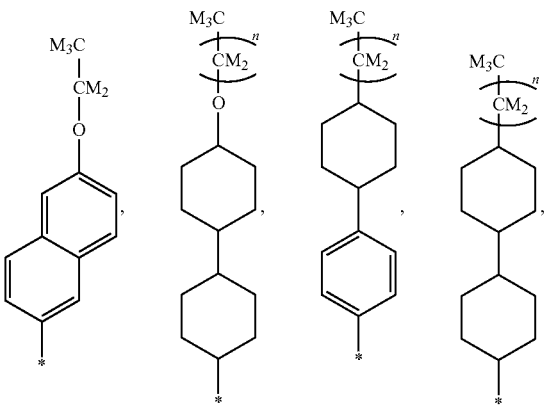

-continued

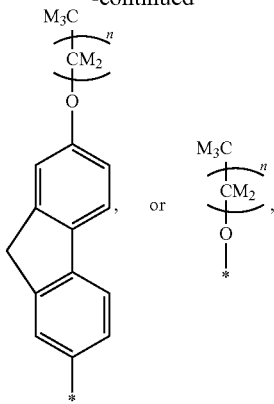

and each M is independently H, CH$_3$, —(CH$_2$)nCH$_3$, F, Br, I, OH, C$_3$H$_7$, NH$_2$, or —CN;
R is

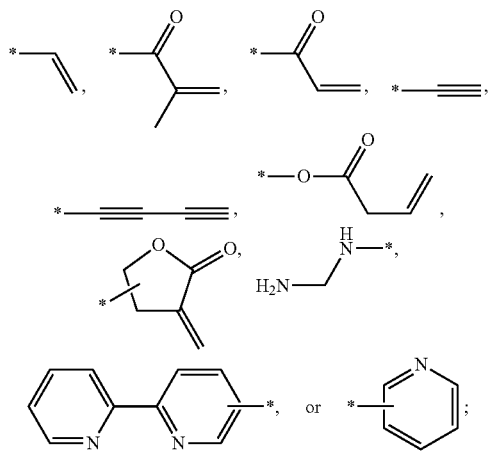

and
X is

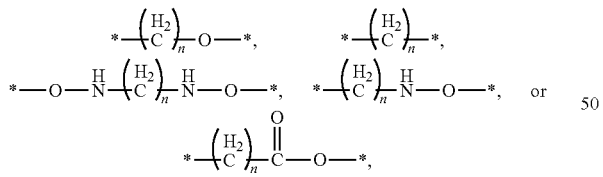

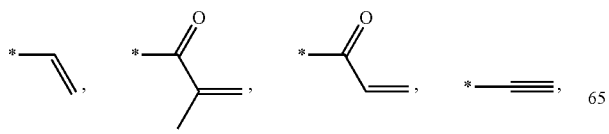

wherein each n is independently a natural number of 1 to 20,
wherein the reactive mesogen represented by Chemical Formula 1 comprises a mixture of a reactive mesogen A in which R is -continued

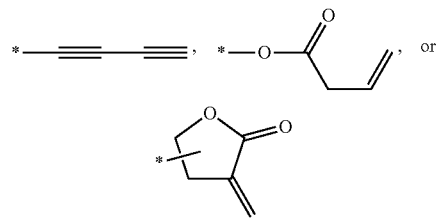

and a reactive mesogen B in which R is

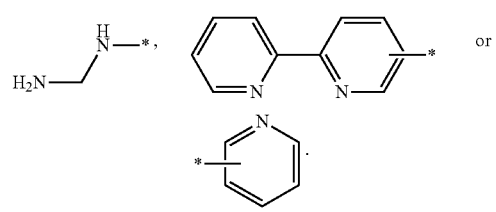

2. A liquid crystal display comprising:
a first substrate;
a second substrate facing the first substrate;
a liquid crystal layer disposed between the first substrate and the second substrate;
a first liquid crystal alignment layer disposed between the liquid crystal layer and the first substrate; and
a second liquid crystal alignment layer disposed between the liquid crystal layer and the second substrate,
wherein at least one of the first liquid crystal alignment layer and the second liquid crystal alignment layer comprise a reactive mesogen represented by Chemical Formula 1, and
wherein at least one of the first liquid crystal alignment layer and the second liquid crystal alignment layer further comprises at least one vertical aligner represented by Chemical Formulas 25 to 29 below, <Chemical Formula 1>

$$\begin{array}{c} VA \\ | \\ X \\ | \\ R \end{array}$$

wherein in the chemical formula 1, VA is

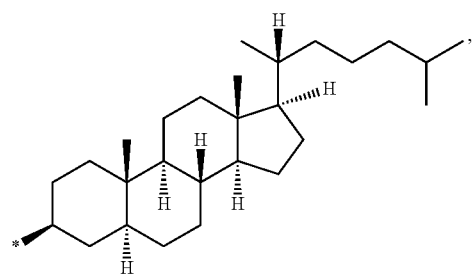

-continued

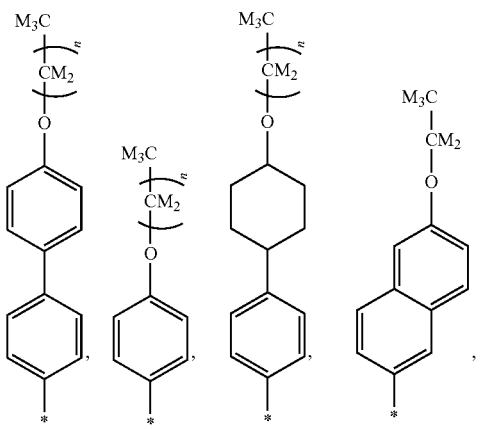

and each M is independently H, CH3, —(CH2)nCH3, F, Br, I, OH, C3H7, NH2, or —CN;

R is

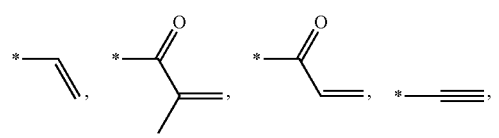

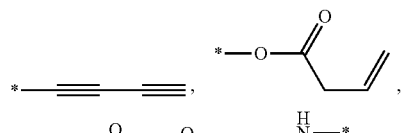

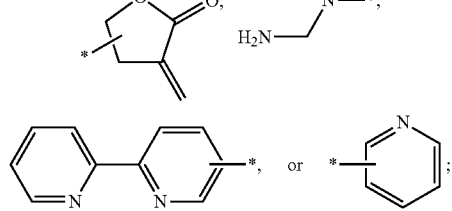

and

X is $$*\!-\!\!\left(\!\!\begin{array}{c}H_2\\C\end{array}\!\!\right)_{\!n}\!\!-\!\!O\!-\!\!*, \quad *\!-\!\!\left(\!\!\begin{array}{c}H_2\\C\end{array}\!\!\right)_{\!n}\!\!-\!\!*,$$

$$*\!-\!\!O\!-\!\!\overset{H}{N}\!\!-\!\!\left(\!\!\begin{array}{c}H_2\\C\end{array}\!\!\right)_{\!n}\!\!-\!\!\overset{H}{N}\!\!-\!\!O\!-\!\!*, \quad *\!-\!\!\left(\!\!\begin{array}{c}H_2\\C\end{array}\!\!\right)_{\!n}\!\!-\!\!\overset{H}{N}\!\!-\!\!O\!-\!\!*, \quad \text{or}$$

$$*\!-\!\!\left(\!\!\begin{array}{c}H_2\\C\end{array}\!\!\right)_{\!n}\!\!-\!\!\overset{O}{\overset{\|}{C}}\!\!-\!\!O\!-\!\!*;$$

wherein each n is independently a natural number of 1 to 20,

<Chemical Formula 25>

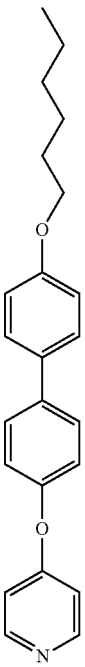

<Chemical Formula 26>

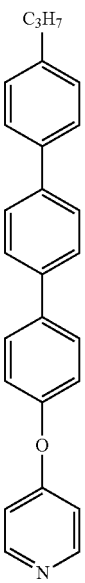

<Chemical Formula 27>

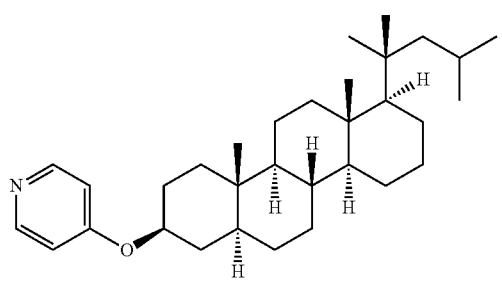

<Chemical Formula 28>

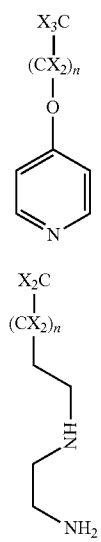

<Chemical Formula 29>

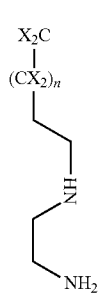

wherein in the Chemical Formulas 28 and 29, each n is independently a natural number of 1 to 20, and X is H, F, Br, I, OH, $C_3H_7$, $NH_2$ or —CN.

3. The liquid crystal display of claim 1, wherein at least one of the first liquid crystal alignment layer and the second liquid crystal alignment layer further comprise a polymerization initiator.

4. The liquid crystal display of claim 1, wherein at least one of the first liquid crystal alignment layer and the second liquid crystal alignment layer further comprise at least one vertical aligner represented by Chemical Formulas 30 to 43 below, <Chemical Formula 30>

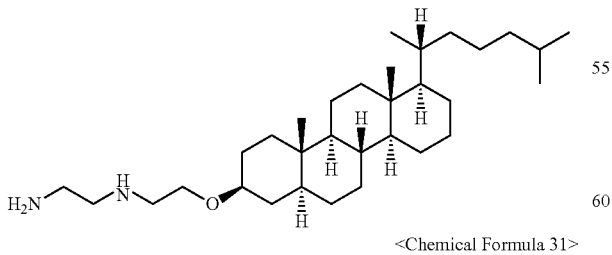

<Chemical Formula 31>

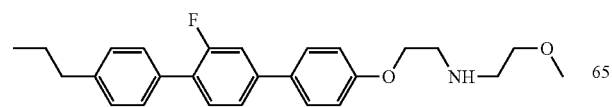

<Chemical Formula 32>

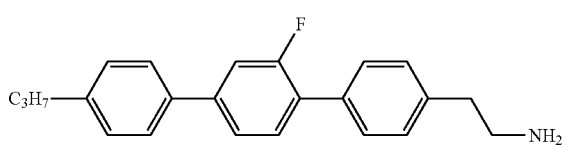

<Chemical Formula 33>

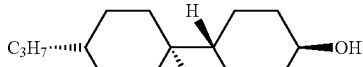

<Chemical Formula 34>

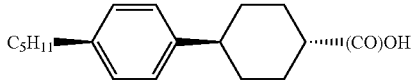

<Chemical Formula 35>

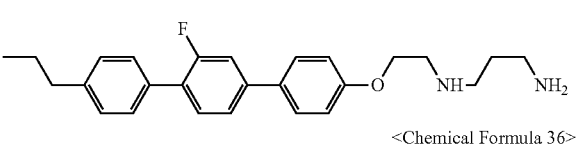

<Chemical Formula 36>

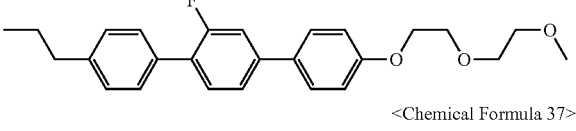

<Chemical Formula 37>

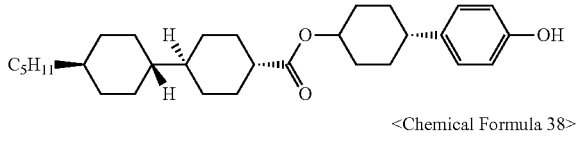

<Chemical Formula 38>

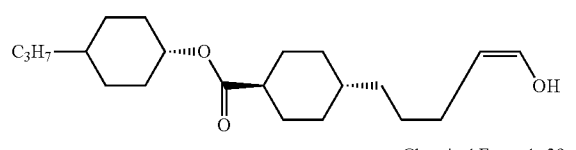

<Chemical Formula 39>

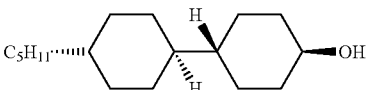

<Chemical Formula 40>

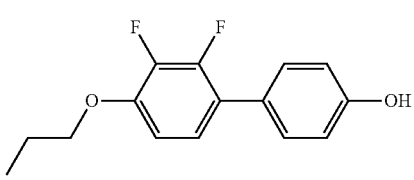

<Chemical Formula 41>

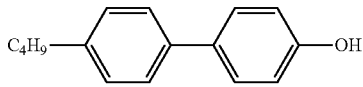

<Chemical Formula 42>

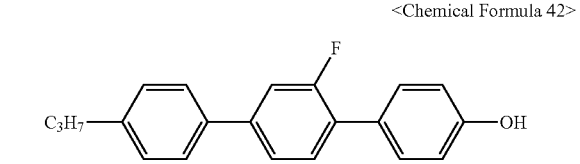

<Chemical Formula 43>

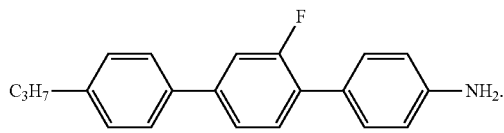

5. The liquid crystal display of claim 1, wherein both the first liquid crystal alignment layer and the second liquid crystal alignment layer comprise the reactive mesogen represented by Chemical Formula 1.

6. The liquid crystal display of claim 2, wherein both the first liquid crystal alignment layer and the second liquid crystal alignment layer comprise the at least one vertical aligner represented by Chemical Formulas 25 to 29.

7. The liquid crystal display of claim 2, wherein at least one of the first liquid crystal alignment layer and the second liquid crystal alignment layer is a single layer comprising a mixture of at least one reactive mesogen represented by Chemical Formula 1 and at least one vertical aligner represented by Chemical Formulas 25 to 29.

8. A method for manufacturing a liquid crystal display, comprising:

preparing a first substrate and a second substrate facing each other;

injecting a liquid crystal composition comprising liquid crystal molecules between the first substrate and the second substrate; and irradiating ultraviolet rays toward at least one of the first substrate and the second substrate while an electric field is applied, wherein the liquid crystals comprise a reactive mesogen represented by Chemical Formula 1, <Chemical Formula 1>

$$\begin{array}{c} VA \\ | \\ X \\ | \\ R \end{array}$$

in the Chemical Formula 1, VA is

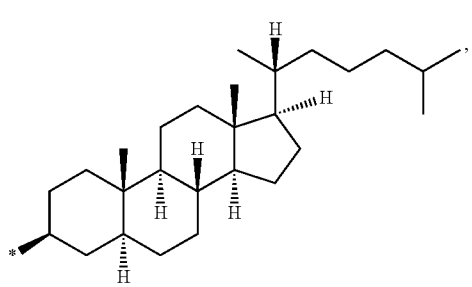

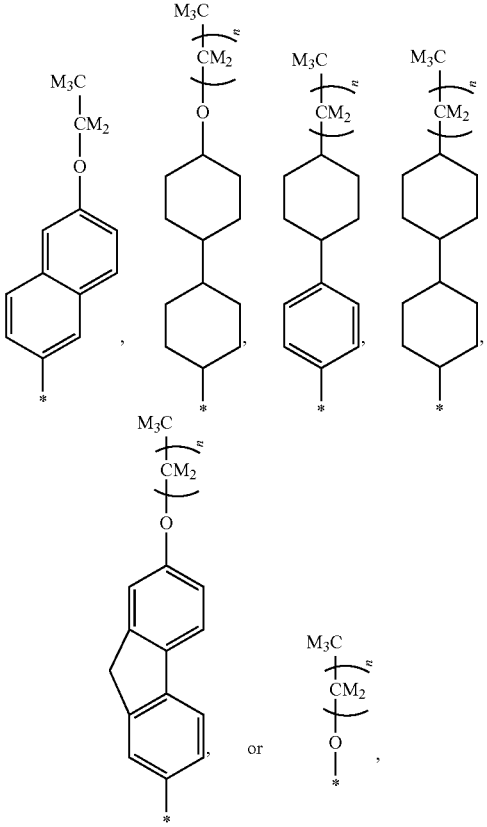

and each M is independently H, $CH_3$, $-(CH_2)nCH_3$, F, Br, I, OH, $C_3H_7$, $NH_2$, or $-CN$;

R is

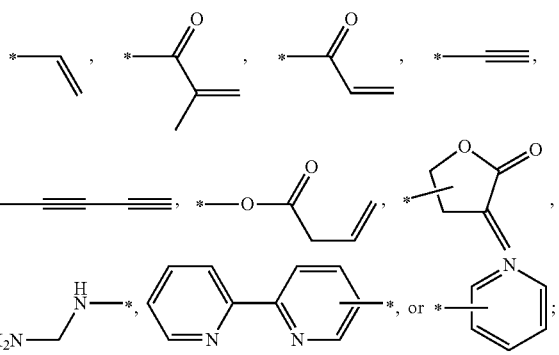

and

X is

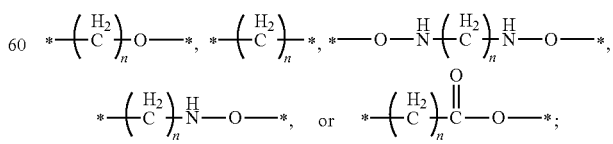

wherein each n is independently a natural number of 1 to 20, wherein the reactive mesogen represented by Chemical Formula 1 comprises a mixture of a reactive mesogen A in which R is

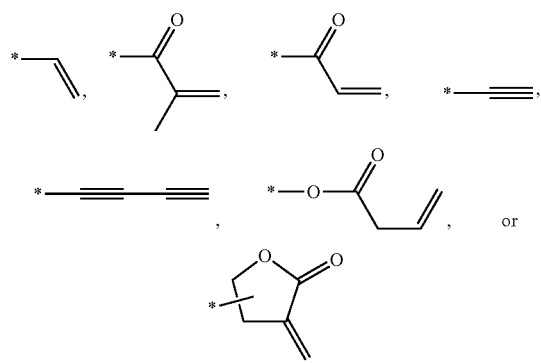

and a reactive mesogen B in which R is

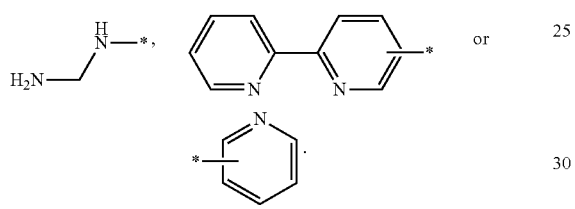

9. The method of claim 8, wherein the liquid crystal composition further comprises at least one vertical aligner represented by Chemical Formulas 25 to 29 below, <Chemical Formula 25>

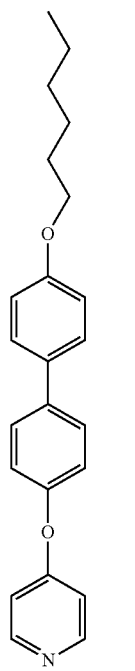

<Chemical Formula 26>

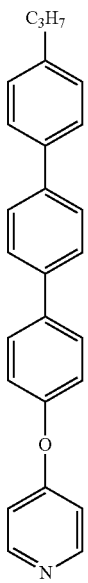

<Chemical Formula 27>

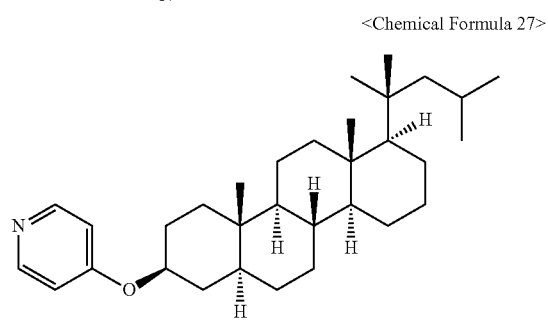

<Chemical Formula 28>

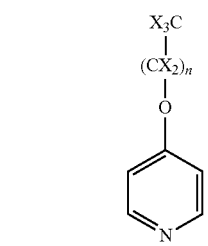

<Chemical Formula 29>

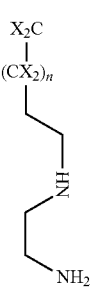

wherein in the Chemical Formulas 28 and 29, each n is independently a natural number of 1 to 20, and X is H, F, Br, I, OH, $C_3H_7$, $NH_2$, or —CN.

10. The method of claim 8, wherein the liquid crystal composition further comprises at least one vertical aligner represented by Chemical Formulas 30 to 43 below, <Chemical Formula 30>

<Chemical Formula 31>

<Chemical Formula 32>

<Chemical Formula 33>

<Chemical Formula 34>

<Chemical Formula 35>

<Chemical Formula 36>

<Chemical Formula 37>

<Chemical Formula 38>

<Chemical Formula 39>

-continued

<Chemical Formula 40>

<Chemical Formula 41>

<Chemical Formula 42>

<Chemical Formula 43>

11. The method of claim 9, wherein injecting the liquid crystal composition further comprises forming a first liquid crystal alignment layer on a surface of the first substrate which faces the second substrate and forming a second liquid crystal alignment layer on a surface of the second substrate which faces the first substrate, wherein the first liquid crystal alignment layer and the second crystal alignment layer are formed by one or more of the reactive mesogen and the vertical aligner.

12. The method of claim 11, wherein the liquid crystal display further comprises a liquid crystal layer comprising first liquid crystal molecules having negative dielectric anisotropy and aligned on a surface of the first liquid crystal alignment layer, and second liquid crystal molecules aligned on a surface of the second liquid crystal alignment layer,
wherein the first liquid crystal molecules and the second liquid crystal molecules are vertically aligned on the surface of the first substrate or the surface of the second substrate before the irradiating of ultraviolet rays while the electric field is applied.

13. The method of claim 12, further comprising removing the electric field after irradiating the ultraviolet rays, wherein the first liquid crystal molecules and the second liquid crystal molecules are arranged at an incline relative to the surface of the first substrate or the surface of the second substrate after irradiating the ultraviolet rays and after removing the electric field.

14. The method of claim 11, wherein at least one of the first liquid crystal alignment layer and the second liquid crystal alignment layer is a single layer formed by mixing at least one reactive mesogen represented by Chemical Formula 1 with at least one vertical aligner represented by Chemical Formulas 25 to 29.

15. The method of claim 9, further comprising irradiating ultraviolet rays when the electric field is not applied before irradiating the ultraviolet rays when the electric field is applied and after the liquid crystal composition is injected.

16. The method of claim 9, further comprising irradiating the ultraviolet rays again after the step of irradiating ultraviolet rays while the electric field is applied.

17. The method of claim 9, wherein the liquid crystal composition further comprises a polymerization initiator.

\* \* \* \* \*